United States Patent
Kuenemund et al.

(10) Patent No.: US 10,410,980 B2
(45) Date of Patent: Sep. 10, 2019

(54) SEMICONDUCTOR CHIP

(71) Applicant: Infineon Technologies AG, Neubiberg (DE)

(72) Inventors: Thomas Kuenemund, Munich (DE); Mayk Roehrich, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 10 days.

(21) Appl. No.: 15/841,379

(22) Filed: Dec. 14, 2017

(65) Prior Publication Data

US 2018/0174985 A1 Jun. 21, 2018

(30) Foreign Application Priority Data

Dec. 16, 2016 (DE) .................... 10 2016 124 590

(51) Int. Cl.
*H01L 23/00* (2006.01)
*H01L 27/02* (2006.01)
(Continued)

(52) U.S. Cl.
CPC ............ *H01L 23/576* (2013.01); *G06F 21/72* (2013.01); *H01L 27/0207* (2013.01);
(Continued)

(58) Field of Classification Search
CPC .................................................. H01L 27/092
See application file for complete search history.

(56) References Cited

U.S. PATENT DOCUMENTS

| 6,117,762 A | 9/2000 | Baukus et al. |
| 2009/0027987 A1* | 1/2009 | Dray ............... G11C 29/24 365/210.1 |

(Continued)

FOREIGN PATENT DOCUMENTS

| DE | 102012212890 A1 | 1/2013 |
| DE | 102015106508 A1 | 10/2015 |
| JP | 4791635 B2 | 10/2011 |

OTHER PUBLICATIONS

Rajendran et al, "Security analysis of integrated circuit camouflaging", CCS'13, Nov. 4-8, 2013, Berlin, Germany.
(Continued)

*Primary Examiner* — Jay C Chang
*Assistant Examiner* — Mikka Liu
(74) *Attorney, Agent, or Firm* — Viering, Jentschura & Partner MBB

(57) ABSTRACT

According to one embodiment, a semiconductor chip is described including a semiconductor chip body and a semiconductor chip circuit on the body and including a first circuit path coupled to a first and a second node and including at least two gate-insulator-semiconductor structures and a second circuit path coupled to the first and the second node and including at least two gate-insulator-semiconductor structures. The first and the second circuit path are connected to set the first and the second node to complementary logic states. In each of the first and the second circuit path, at least one of the gate-insulator-semiconductor structures is configured as field effect transistor. In at least one of the first and the second circuit path, at least one of the gate-insulator-semiconductor structures is configured to connect the circuit path to the semiconductor body.

15 Claims, 23 Drawing Sheets

(51) Int. Cl.
  *H01L 27/092* (2006.01)
  *G06F 21/72* (2013.01)
  *H01L 21/8238* (2006.01)
  *G06F 21/00* (2013.01)
  *H01L 27/118* (2006.01)

(52) U.S. Cl.
  CPC ............ *H01L 27/092* (2013.01); *G06F 21/00* (2013.01); *H01L 21/823871* (2013.01); *H01L 2027/11838* (2013.01)

(56) References Cited

U.S. PATENT DOCUMENTS

| | | | |
|---|---|---|---|
| 2009/0170255 | A1 | 7/2009 | Chow et al. |
| 2012/0242373 | A1* | 9/2012 | Chen .................... H03K 3/0375 327/81 |
| 2013/0027114 | A1 | 1/2013 | Petruzzi et al. |
| 2014/0061808 | A1 | 3/2014 | Nakatsuka et al. |
| 2015/0311202 | A1 | 10/2015 | Kuenemund |
| 2016/0372476 | A1* | 12/2016 | Hung ................. H01L 29/7851 |

OTHER PUBLICATIONS

Korean Office Action based on Application No. 10-2017-0165861 (7 pages) dated Apr. 3, 2019 (for reference purpose only).

* cited by examiner

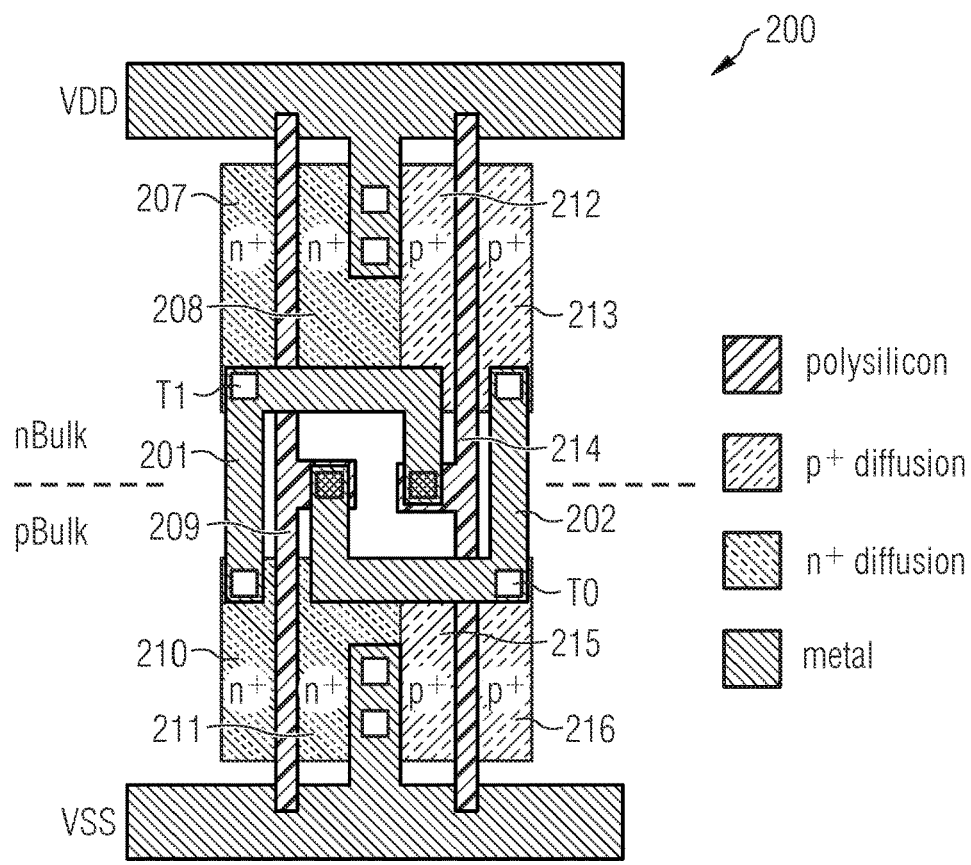
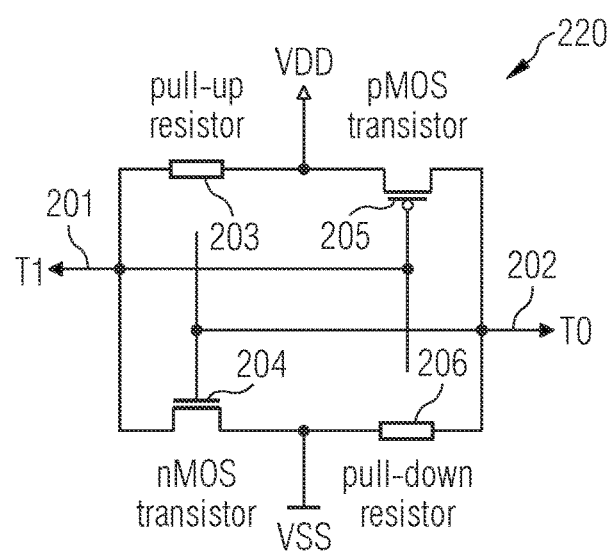

FIG 3
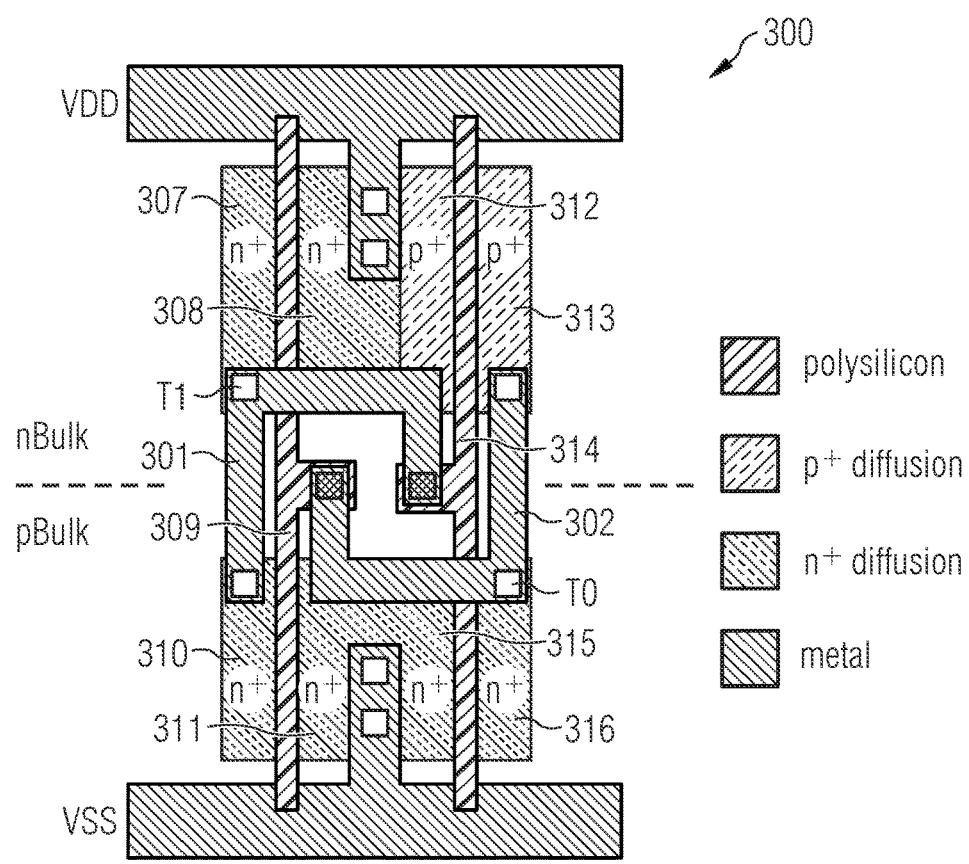
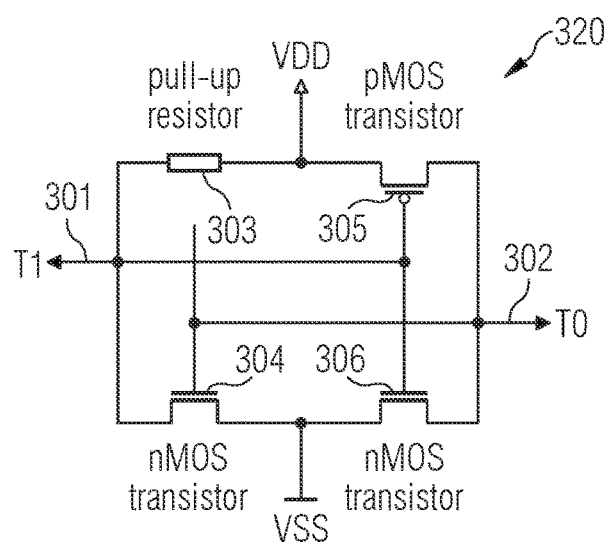

FIG 4
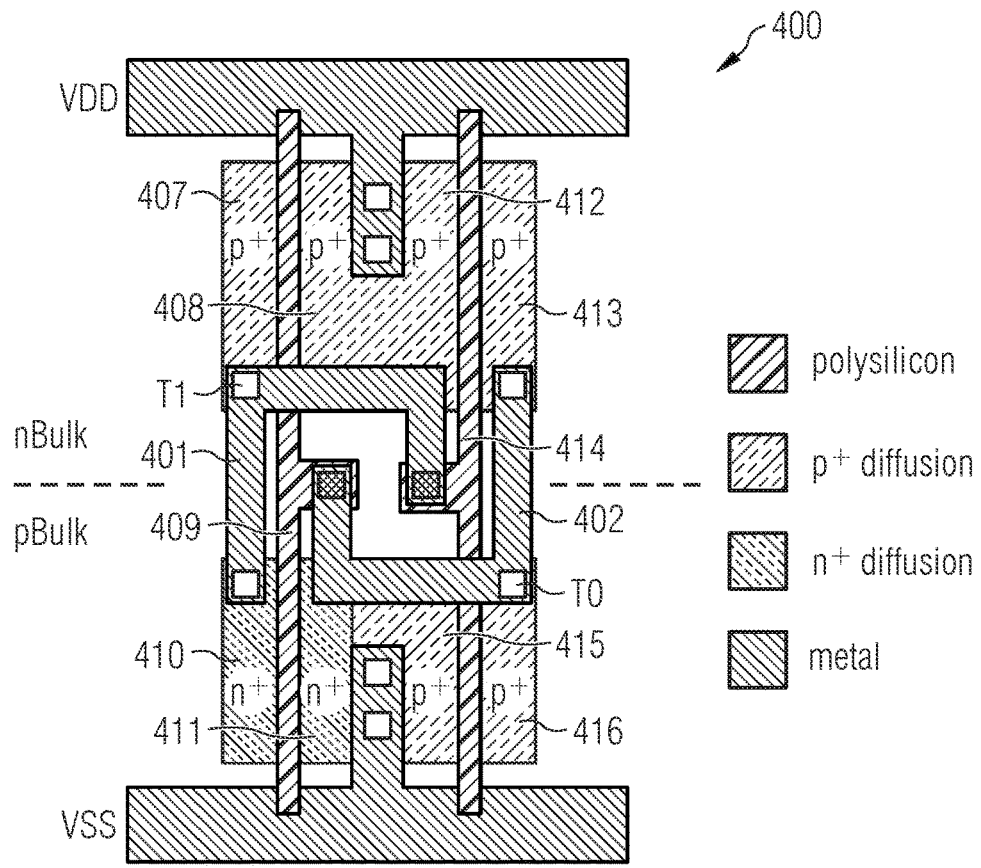
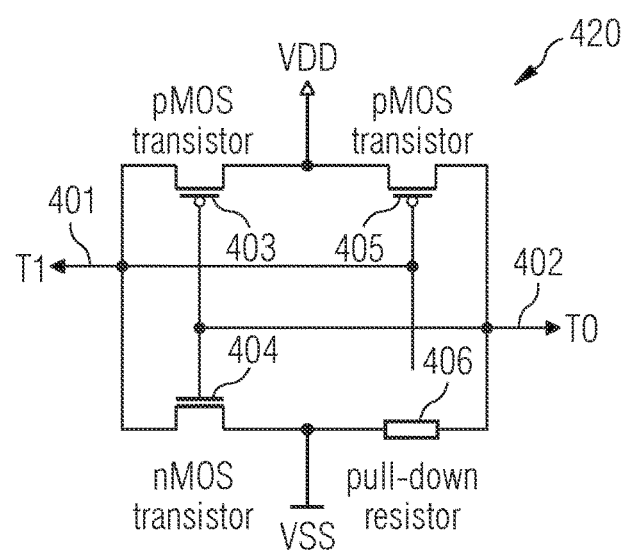

SEMICONDUCTOR CHIP

CROSS-REFERENCE TO RELATED APPLICATION

This application claims priority to German Patent Application Serial No. 10 2016 124 590.9, which was filed Dec. 16, 2016, and is incorporated herein by reference in its entirety.

TECHNICAL FIELD

The present disclosure relates to semiconductor chips.

BACKGROUND

Reverse Engineering (RE) of integrated circuits (ICs) can be considered as one of the most serious threats to semiconductor industry, since it may be misused by an attacker to steal and/or pirate a circuit design. An attacker who successfully reverse engineers an integrated circuit can fabricate and sell a similar, i.e. cloned circuit, and illegally sell and reveal the design.

Therefore concepts and techniques that thwart reverse engineering of integrated circuits are desirable.

SUMMARY

According to one embodiment, a semiconductor chip is provided including a semiconductor chip body and a semiconductor chip circuit arranged on the semiconductor chip body and including a first circuit path coupled to a first node and a second node and including at least two gate-insulator-semiconductor structures and a second circuit path coupled to the first node and the second node and including at least two gate-insulator-semiconductor structures. The first circuit path and the second circuit path are connected to set the first node and the second node to complementary logic states. In the first circuit path, at least one of the gate-insulator-semiconductor structures is configured as field effect transistor and in the second circuit path at least one of the gate-insulator-semiconductor structures is configured as field effect transistor. In at least one of the first circuit path and the second circuit path, at least one of the gate-insulator-semiconductor structures is configured to connect the circuit path to the semiconductor body.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 2 shows an example of a layout for an ITC-X cell and a schematic of the ITC-X cell.

FIG. 3 shows a second example of a layout for an ITC-X cell and a schematic of the ITC-X cell.

FIG. 4 shows a third example of a layout for an ITC-X cell and a schematic of the ITC-X cell.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
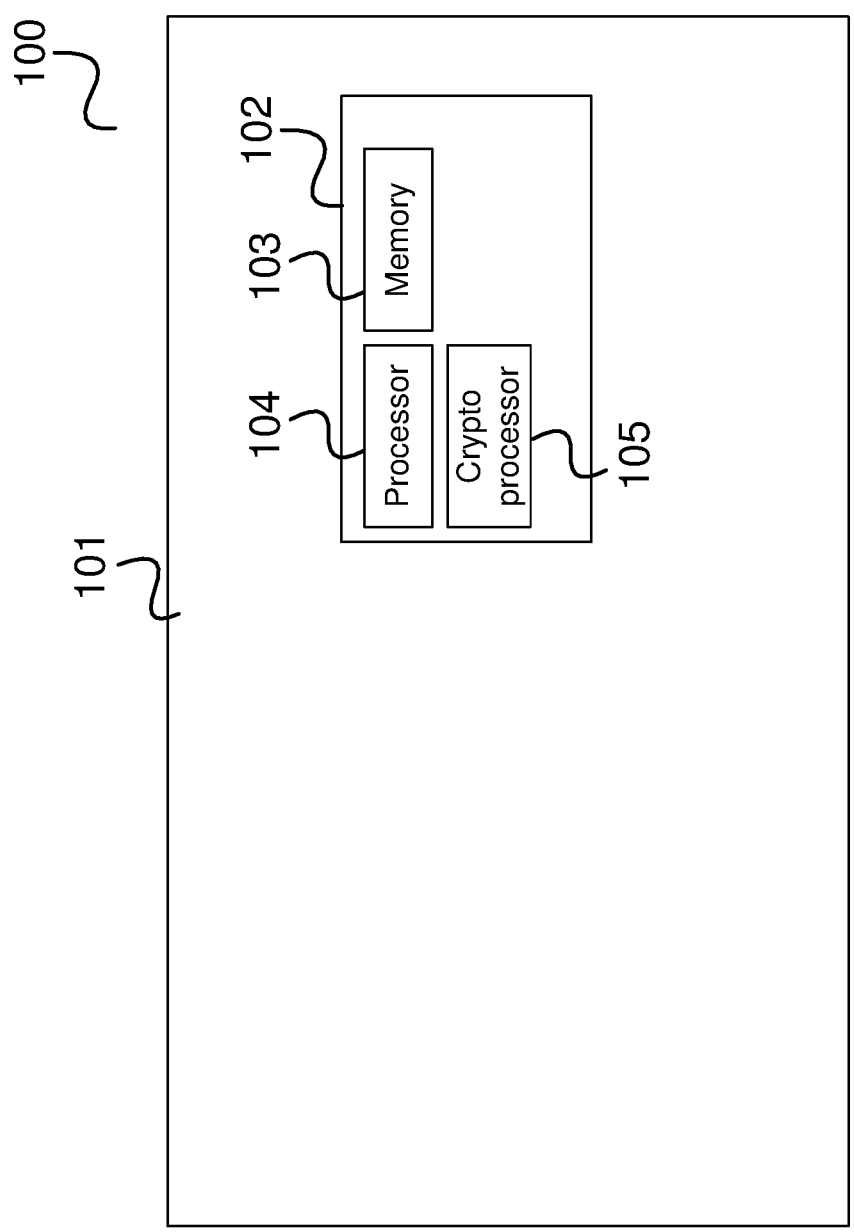
FIG. 1 shows a chip card according to an embodiment.

It is desirable for a large variety of chips to be protected against reverse engineering, in particular for chips used in security-related contexts such as on a chip card as illustrated in FIG. 1.

FIG. 1 shows a chip card 100 according to an embodiment.

The chip card 100 includes a carrier 101 on which a chip card module 102 is arranged. The chip card module 102 includes various data processing components like for example a memory 103, a processor 104 or for example a dedicated crypto processor 105.

Approaches to thwart reverse engineering of chips like the chip card module 102 may deploy camouflaged circuits (e.g. for implementation of proprietary algorithms for Security ICs) that necessitate process technology extensions like doping profile modifications or faked contacts or vias that entail significantly increased area and energy consumption. Thus, these measures are often too expensive for mass products.

In the following, approaches for hindering reverse engineering are described which are based on a concept referred to as indistinguishable TIE cells (ITCs).

According to this concept, a well contact is used instead of a source diode or drain diode (as it is present in a field effect transistor) to conceal a Boolean Secret in a cell (referred to as ITC-X cell), i.e. an information $X \in \{0,1\}$ which, as a result, cannot be detected by a common reverse engineering approach like automated pattern recognition. In other words, in an ITC-X cell, one or more well-contacts (provided instead of a source diode or a drain diode) are used to feign a field effect transistor (FET). There is a short circuit or a resistance instead of the diode of a MOSFET (metal oxide semiconductor FET). The ITC-X cell provides a static Boolean Secret $X \in \{0,1\}$. The two variants of the cell (depending on whether X=1 and X=0), i.e. ITC-1 and ITC-0, exhibit indistinguishable physical design.

ITC-X Cells allow providing Boolean Secrets with more than 5000 concealed bits/mm² for deep submicron technologies, may replace conventional TIE-ONE/ZERO cells, i.e. minimizes area impact, may protect well contacts against FIB (Forced Ion Beam) attacks, i.e. minimize area impact.

An attacker would have to identify all different ITC-X flavors (i.e. ITC-0 cells and ITC-1 cells), e.g. would have to nano-probe arbitrarily many ITC-X distributed like conventional well contacts (TAP cells), i.e. at maximum distances of about 50 µm. Thus, ITC-X cells (which may be distributed in a high number over a chip) cause tremendously increased RE effort, thereby protecting also regular circuitry against invasive attacks like FIB probing or forcing.

For example, in chip design and manufacturing

ITC-X cells may be used to replace all (or a large quantity) of the chip's Semi-Custom (SC) TAP-cells (n-well /p-well contacts), i.e. ITC-X cells may be placed at regular distances prior to regular Standard Cells.

ITC-X cells may also be used to replace all (or a large quantity) of the chip's TIE-ONE/ZERO cells ALL ITC-X cells (each one being an ITC-0 or an ITC-1) are for example automatically connected to a functional semi-custom logic, so that the ITC-X cells may be considered as FIB-protected TAP-cells. For example, a place and route (P&R) flow extension can be used to automatically connect ITC-X outputs to SC logic provided to receive TIE-ONE/ZERO outputs and to SC logic that makes use of the ITC-X cell's Boolean Secrets.

Optionally, a logical diffusion layer between the ITC-X cells and the receiving circuitry may be used in order to connect all ITC-X cells.

FIG. 2 shows an example of a layout 200 for an ITC-X cell and below a schematic 220 of the ITC-X cell.

The ITC-X cell 200 includes a T1 terminal 201 and a T0 terminal 202.

A first gate-insulator-semiconductor structure 203 is connected between the T1 terminal 201 and a high supply potential (VDD). A second gate-insulator-semiconductor structure 204 is connected between the T1 terminal 201 and a low supply potential (VSS).

A third gate-insulator-semiconductor structure 205 is connected between the T0 terminal 202 and the high supply potential. A fourth gate-insulator-semiconductor structure 206 is connected between the T0 terminal 202 and the low supply potential.

The first gate-insulator-semiconductor structure 203 and the third gate-insulator-semiconductor structure 205 are located in a nBulk (nWell or n-substrate) and the second gate-insulator-semiconductor structure 204 and the fourth gate-insulator-semiconductor structure 206 are located in a pBulk (pWell or p-substrate). The semiconductor bulk which may include n-doped regions (nBulk) or p-doped regions (pBulk), which may be wells in the chip's substrate or the chip's substrate itself is also referred to as semiconductor body.

The first gate-insulator-semiconductor structure 203 includes a first n+-doped region 207 and a second n+-doped region 208 which are separated by a gap covered by a first gate line 209.

The second gate-insulator-semiconductor structure 204 includes a third n+-doped region 210 and a fourth n+-doped region 211 which are separated by a gap covered by the first gate line 209.

The third gate-insulator-semiconductor structure 205 includes a first p+-doped region 212 and a second p+-doped region 213 which are separated by a gap covered by a second gate line 214.

The fourth gate-insulator-semiconductor structure 206 includes a third p+-doped region 215 and a fourth p+-doped region 216 which are separated by a gap covered by the second gate line 214.

Accordingly, the second gate-insulator-semiconductor structure 204 implements an nMOS transistor (n channel MOSFET) and the third gate-insulator-semiconductor structure 205 implements a pMOS transistor (p channel MOSFET). The first gate-insulator-semiconductor structure 203 and the fourth gate-insulator-semiconductor structure however implement resistors since the first n+-doped region 207 and the second n+-doped region 208 are located in the nBulk (and would have to be p+-doped regions to implement a MOSFET) and the third p+-doped region 215 and the fourth p+-doped region 216 are located in the pBulk (and would have to be n+-doped regions to implement a MOSFET).

Thus, the ITC-X cell of FIG. 2 seemingly implements two cross-coupled inverters, where, however, one pMOS and one nMOS transistor are faked FETs because their S/D (source/drain) pn-junctions are replaced by well contacts: for the first gate-insulator-semiconductor structure 203 (seemingly a pMOS transistor) the p+-nBulk S/D junctions are replaced by n+-nBulk ohmic contacts (indicated as pull-up resistor in the schematic 220), and for the fourth gate-insulator-semiconductor structure 206 (seemingly an nMOS transistor) the n+-pWell S/D junctions are replaced by p+-pBulk ohmic contacts (indicated as pull-down resistor in the schematic 220).

FIG. 3 shows a second example of a layout 300 for an ITC-X cell and below a schematic 320 of the ITC-X cell.

The ITC-X cell 300 includes a T1 terminal 301 and a T0 terminal 302.

A first gate-insulator-semiconductor structure 303 is connected between the T1 terminal 301 and a high supply potential (VDD). A second gate-insulator-semiconductor structure 304 is connected between the T1 terminal 301 and a low supply potential (VSS).

A third gate-insulator-semiconductor structure 305 is connected between the T0 terminal 302 and the high supply potential. A fourth gate-insulator-semiconductor structure 306 is connected between the T0 terminal 302 and the low supply potential.

The first gate-insulator-semiconductor structure 303 and the third gate-insulator-semiconductor structure 305 are located in a nBulk (nWell or n-substrate) and the second gate-insulator-semiconductor structure 304 and the fourth gate-insulator-semiconductor structure 306 are located in a pBulk (pWell or p-substrate)

The first gate-insulator-semiconductor structure 303 includes a first n+-doped region 307 and a second n+-doped region 308 which are separated by a gap covered by a first gate line 309.

The second gate-insulator-semiconductor structure 304 includes a third n+-doped region 310 and a fourth n+-doped region 311 which are separated by a gap covered by the first gate line 309.

The third gate-insulator-semiconductor structure 305 includes a first p+-doped region 312 and a second p+-doped region 313 which are separated by a gap covered by a second gate line 314.

The fourth gate-insulator-semiconductor structure 306 includes a fifth n+-doped region 315 and a sixth n+-doped region 316 which are separated by a gap covered by the second gate line 314.

Accordingly, the second gate-insulator-semiconductor structure 304 implements an nMOS transistor, the third gate-insulator-semiconductor structure 305 implements a pMOS transistor and the fourth gate-insulator-semiconductor structure 306 implements an nMOS transistor. The first gate-insulator-semiconductor structure 303 however implements a resistor since the first n+-doped region 307 and the second n+-doped region 308 are located in the nBulk (and would have to be p+-doped regions to implement a MOSFET).

Thus, the ITC-X cell of FIG. 3 seemingly implements two cross-coupled inverters, where, however, one pMOS transistor is a faked FET because its S/D (source/drain) pn-junctions are replaced by well contacts: for the first gate-insulator-semiconductor structure 303 (seemingly a pMOS transistor) the p+-nBulk S/D junctions are replaced by n+-nBulk ohmic contacts (indicated as pull-up resistor in the schematic 320).

FIG. 4 shows a third example of a layout 400 for an ITC-X cell and below a schematic 420 of the ITC-X cell.

The ITC-X cell 400 includes a T1 terminal 401 and a T0 terminal 402.

A first gate-insulator-semiconductor structure 403 is connected between the T1 terminal 401 and a high supply potential (VDD). A second gate-insulator-semiconductor structure 404 is connected between the T1 terminal 401 and a low supply potential (VSS).

A third gate-insulator-semiconductor structure 405 is connected between the T0 terminal 402 and the high supply potential. A fourth gate-insulator-semiconductor structure 406 is connected between the T0 terminal 402 and the low supply potential.

The first gate-insulator-semiconductor structure 403 and the third gate-insulator-semiconductor structure 405 are located in a nBulk (nWell or n-substrate) and the second gate-insulator-semiconductor structure 404 and the fourth gate-insulator-semiconductor structure 406 are located in a pBulk (pWell or p-substrate)

The first gate-insulator-semiconductor structure 403 includes a first p+-doped region 407 and a second p+-doped region 408 which are separated by a gap covered by a first gate line 409.

The second gate-insulator-semiconductor structure 404 includes a first n+-doped region 410 and a second n+-doped region 411 which are separated by a gap covered by the first gate line 409.

The third gate-insulator-semiconductor structure 405 includes a third p+-doped region 412 and a fourth p+-doped region 413 which are separated by a gap covered by a second gate line 414.

The fourth gate-insulator-semiconductor structure 406 includes a fifth p+-doped region 415 and a sixth p+-doped region 416 which are separated by a gap covered by the second gate line 414.

Accordingly, the first gate-insulator-semiconductor structure 403 implements a pMOS transistor (n channel MOSFET), the second gate-insulator-semiconductor structure 404 implements an nMOS transistor (n channel MOSFET) and the third gate-insulator-semiconductor structure 405 implements a pMOS transistor (p channel MOSFET). However, the fourth gate-insulator-semiconductor structure implements a resistor since the fifth p+-doped region 415 and the sixth p+-doped region 416 are located in the pBulk (and would have to be n+-doped regions to implement a MOSFET).

Thus, the ITC-X cell of FIG. 4 seemingly implements two cross-coupled inverters, where, however, one nMOS transistor is a faked FET because its S/D (source/drain) pn-junctions are replaced by well contacts: for the fourth gate-insulator-semiconductor structure 406 (seemingly an nMOS transistor) the n+-pWell S/D junctions are replaced by p+-pBulk ohmic contacts (indicated as pull-down resistor in the schematic 420).

As a consequence, for all three examples of FIGS. 2 to 4, with powering up the integrated circuit including the respective ITC-X cell, node T1 is pulled up to VDD and T0 is pulled down to VSS, at least one of them because of a pull-up resistor or a pull-down resistor and the other by feedback (from the node which is pulled down or pulled up to the gate of a field effect transistor).

In the examples of FIGS. 2 to 4, the faked pMOS transistors and the faked nMOS transistors had the doping of both their source region and drain region (i.e. the regions which would be the source region and the drain region if they were MOSFETs) changed. However, it is also possible to change the doping of only one of them. This is illustrated in FIG. 5.

Figure 5:
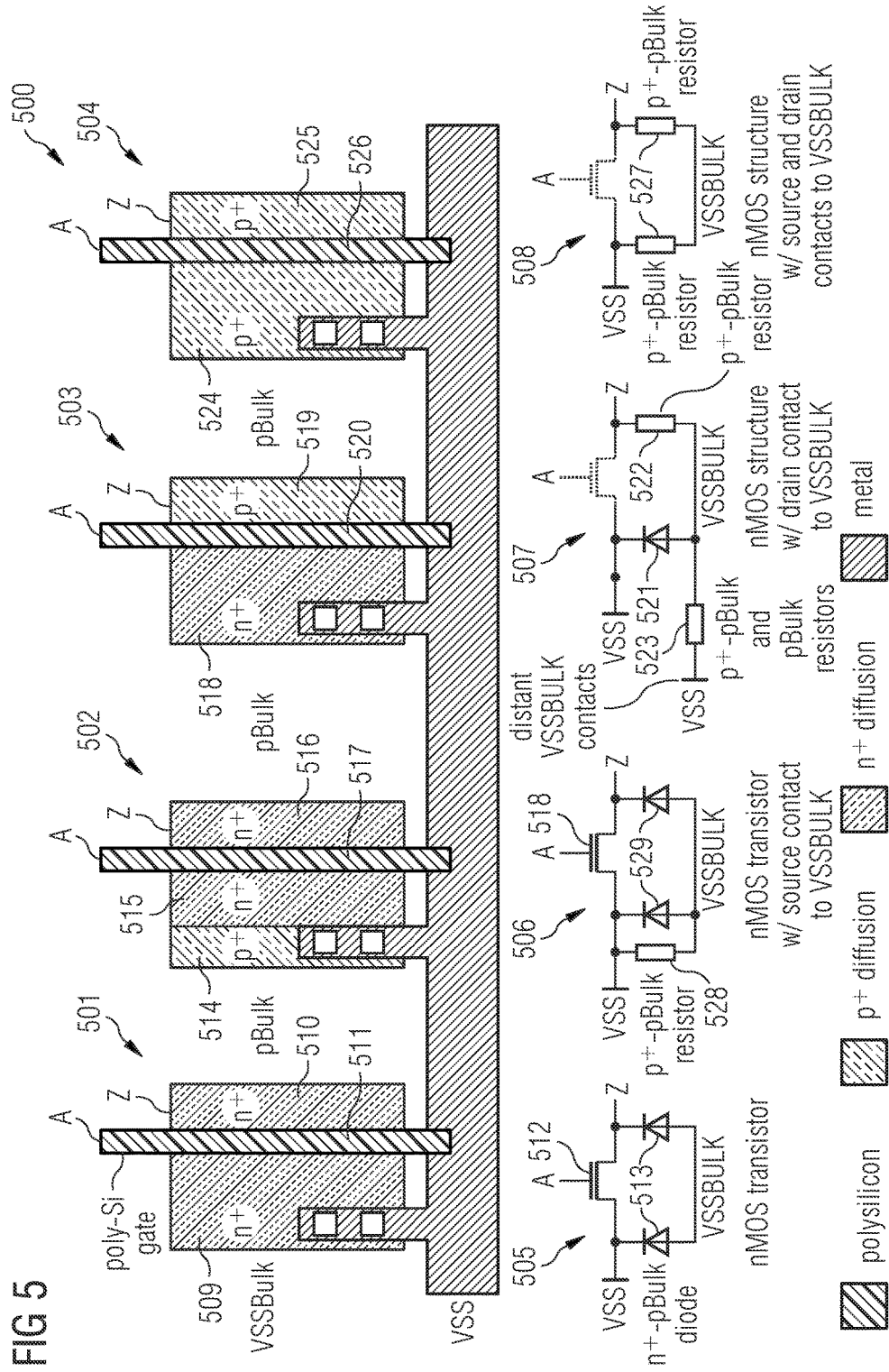
FIG. 5 shows layouts and corresponding schematics of gate-insulator-semiconductor structures to implement or fake an nMOS transistor.

FIG. 5 shows layouts 501 and 504 and corresponding schematics 505 to 508 of gate-insulator-semiconductor structures to implement or fake an nMOS transistor.

A first layout 501 and the corresponding first schematic 505 illustrate a first gate-insulator-semiconductor structure implementing an nMOS transistor.

The first gate-insulator-semiconductor structure includes a first n+-doped region 509 and a second n+-doped region 510 separated by a gap covered by a first gate line 511.

The first n+-doped region 509 is connected to a low supply potential (VSS).

The first gate-insulator-semiconductor structure thus implements an nMOS transistor 512 having pn junctions (diodes) 513 between its source region and pBulk and its drain region and pBulk.

A second layout 502 and the corresponding second schematic 506 illustrate a second gate-insulator-semiconductor structure implementing an nMOS transistor.

The second gate-insulator-semiconductor structure includes a first p+-doped region 514, a third n+-doped region 515 and a fourth n+-doped region 516 separated by a gap covered by a second gate line 517.

The first p+-doped region 514 is connected to the low supply potential.

The second gate-insulator-semiconductor structure thus implements an nMOS transistor 518 having pn junctions (diodes) 529 between its source region and pBulk and its drain region and pBulk and an additional p+-abutted contact (p+-pBulk resistor) 528 between its source region and pBulk.

It should be noted that the first p+-doped region 514 and the third n+-doped region 515 form an abutted contact, i.e. a resistor, which may be used to arrange a bulk contact next to a source or drain region.

A third layout 503 and the corresponding third schematic 507 illustrate a third gate-insulator-semiconductor structure which fakes an nMOS transistor (shown dashed in the third schematic 507).

The third gate-insulator-semiconductor structure includes a fifth n+-doped region 518 and a second p+-doped region 519 separated by a gap covered by a third gate line 520.

The fifth n+-doped region 518 is connected to the low supply potential.

The fifth n+-doped region 518 in pBulk implements a diode 521. However, since the second p+-doped region 519 is located in pBulk there is no pn junction on this side of the third gate-insulator-semiconductor structure but a p+-pBulk resistor 522. Via further p+-pBulk resistors and pBulk resistors 523 the pBulk area in which the third gate-insulator-semiconductor structure is located is connected to VSS connected to the chip's bulk by distant VSSBULK contacts.

A fourth layout 504 and the corresponding fourth schematic 508 illustrate a fourth gate-insulator-semiconductor structure which fakes an nMOS transistor (shown dashed in the fourth schematic 508).

The fourth gate-insulator-semiconductor structure includes a fourth p+-doped region 524 and a fifth p+-doped region 525 separated by a gap covered by a fourth gate line 526.

The fourth p+-doped region 524 is connected to the low supply potential.

Since the fourth p+-doped region 524 and the fifth p+-doped region 525 are located in pBulk there are no pn junction on both sides of the fourth gate-insulator-semiconductor structure but p+-pBulk resistors 527.

For the pMOS case, gate-insulator-semiconductor structures may be used to implement or fake a pMOS transistor analogously to the nMOS case illustrated in FIG. 5. For the pMOS case, nBulk replaces pBulk, n+ replaces p+ and vice versa and VDD replaces VSS with respect to nMOS case illustrated in FIG. 5.

In the examples of FIGS. 2 to 4, nMOS transistors are faked by gate-insulator-semiconductor structures like the fourth gate-insulator-semiconductor structure of FIG. 5 (illustrated by the fourth layout 504 and the fourth schematic 508), where there are bulk connections on both sides instead of pn-junctions (like for a MOSFET) are used.

Figure 6:
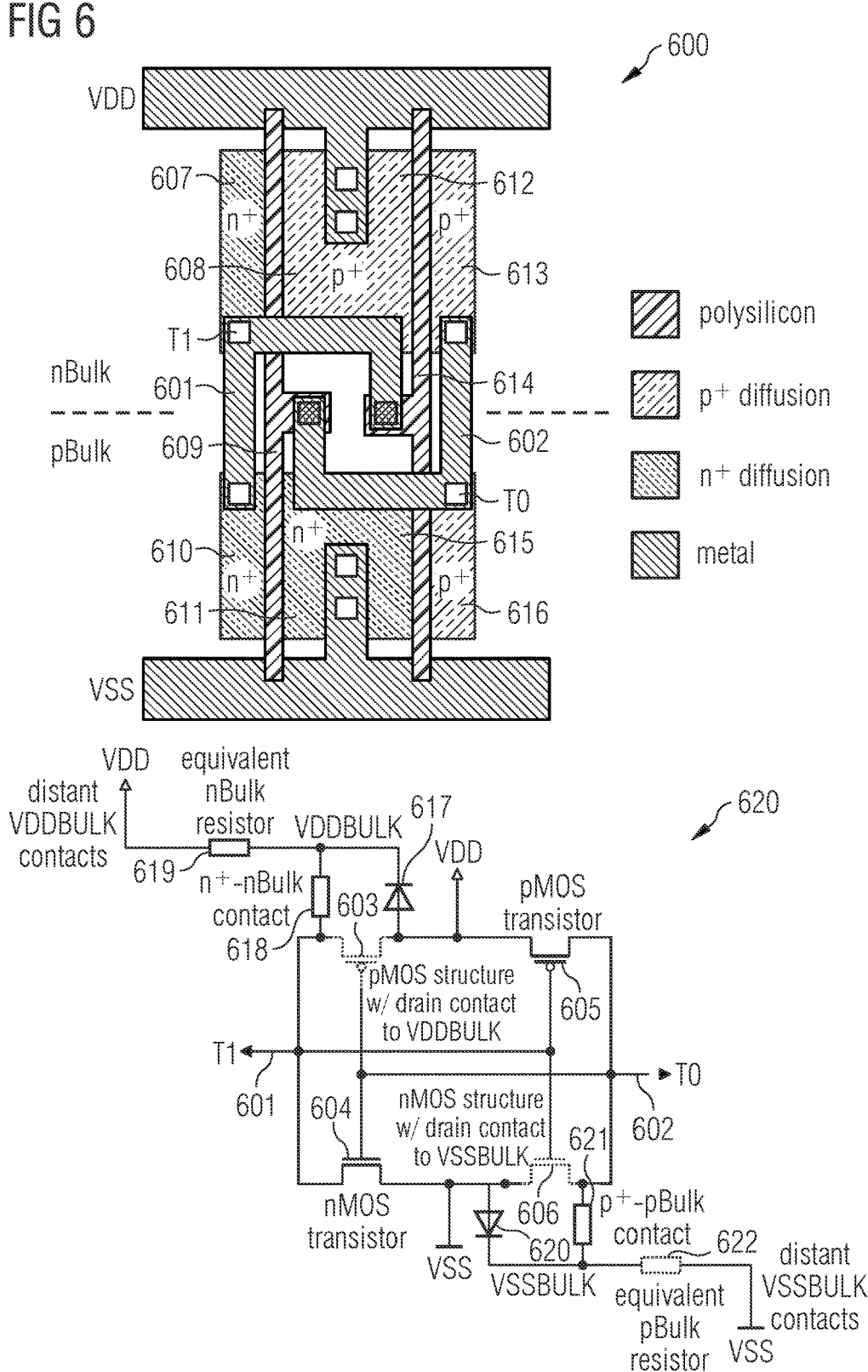
FIG. 6 shows an example of a layout for an ITC-X cell and a schematic of the ITC-X cell where MOSFETs are faked by using gate-insulator-semiconductor structures which have a bulk connections resistors on only one side.

FIG. 6 shows an example of a layout 600 for an ITC-X cell and below a schematic 620 of the ITC-X cell where MOSFETs are faked by using gate-insulator-semiconductor structures which have a bulk connection on only one side (similar to the third gate-insulator-semiconductor structure illustrated by the third layout 503 and the third schematic 507).

The ITC-X cell 600 includes a T1 terminal 601 and a T0 terminal 602.

A first gate-insulator-semiconductor structure 603 is connected between the T1 terminal 601 and a high supply potential (VDD). A second gate-insulator-semiconductor structure 604 is connected between the T1 terminal 601 and a low supply potential (VSS).
A third gate-insulator-semiconductor structure 605 is connected between the T0 terminal 602 and the high supply potential. A fourth gate-insulator-semiconductor structure 606 is connected between the T0 terminal 602 and the low supply potential.

The first gate-insulator-semiconductor structure 603 and the third gate-insulator-semiconductor structure 605 are located in a nBulk (nWell or n-substrate) and the second gate-insulator-semiconductor structure 604 and the fourth gate-insulator-semiconductor structure 606 are located in a pBulk (pWell or p-substrate)

The first gate-insulator-semiconductor structure 603 includes a first n+-doped region 607 and a first p+-doped region 608 which are separated by a gap covered by a first gate line 609.

The second gate-insulator-semiconductor structure 604 includes a second n+-doped region 610 and a third n+-doped region 611 which are separated by a gap covered by the first gate line 609.

The third gate-insulator-semiconductor structure 605 includes a second p+-doped region 612 and a third p+-doped region 613 which are separated by a gap covered by a second gate line 614.

The fourth gate-insulator-semiconductor structure 606 includes a fourth n+-doped region 615 and a fourth p+-doped region 616 which are separated by a gap covered by the second gate line 614.

Accordingly, the second gate-insulator-semiconductor structure 604 implements an nMOS transistor (n channel MOSFET) and the third gate-insulator-semiconductor structure 605 implements a pMOS transistor (p channel MOSFET). The first gate-insulator-semiconductor structure 603 fakes a pMOS transistor and the fourth gate-insulator-semiconductor structure fakes an nMOS transistor since the first n+-doped region 607 is located in the nBulk (and would have to be p+-doped region to implement a MOSFET) and the fourth p+-doped region 616 is located in the pBulk (and would have to be an n+-doped region to implement a MOSFET).

The first gate-insulator-semiconductor structure 603 has a pn-junction (diode) 617 on its right side but an n+-nBulk contact (resistor) 618 on its left side. Via the n+-nBulk contact 618 and the nBulk resistance 619 the first n+-doped region 607 is connected to VDD connected to the chip's bulk by distant VDDBULK contacts.

The fourth gate-insulator-semiconductor structure 606 has a pn-junction (diode) 629 on its left side but an p+-pBulk contact (resistor) 621 on its right side. Via the p+-pBulk contact 621 and the pBulk resistance 622 the fourth p+-doped region 616 is connected to VSS connected to the chip's bulk by distant VSSBULK contacts.

Thus, the ITC-X cell of FIG. 6 seemingly implements two cross-coupled inverters, where, however, one pMOS and one nMOS transistor are faked FETs because one of their S/D (source/drain) pn-junctions are replaced by well contacts.

Figure 7:
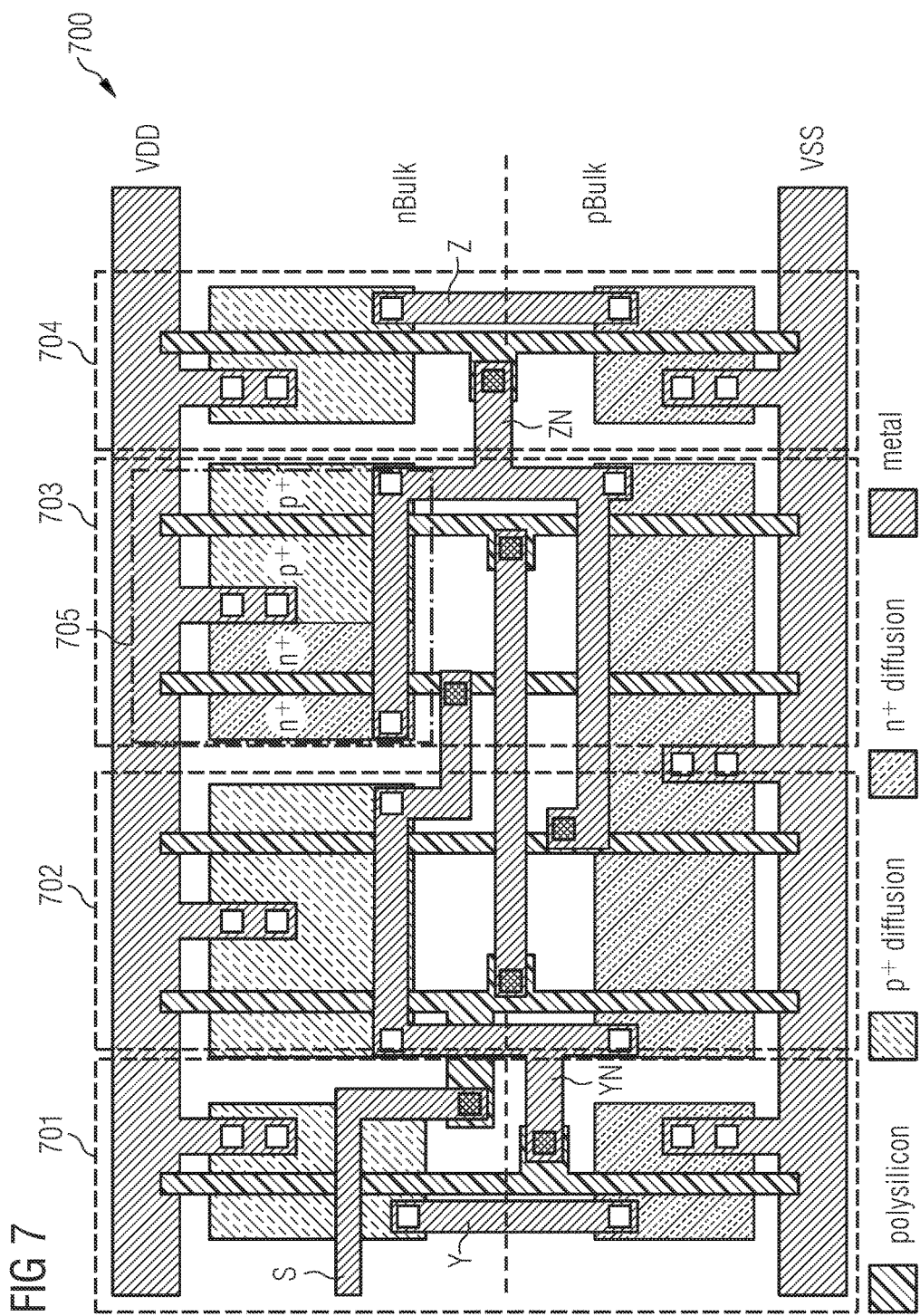
FIG. 7 shows a layout of an RS-Flip-Flop structure.
Figure 8:
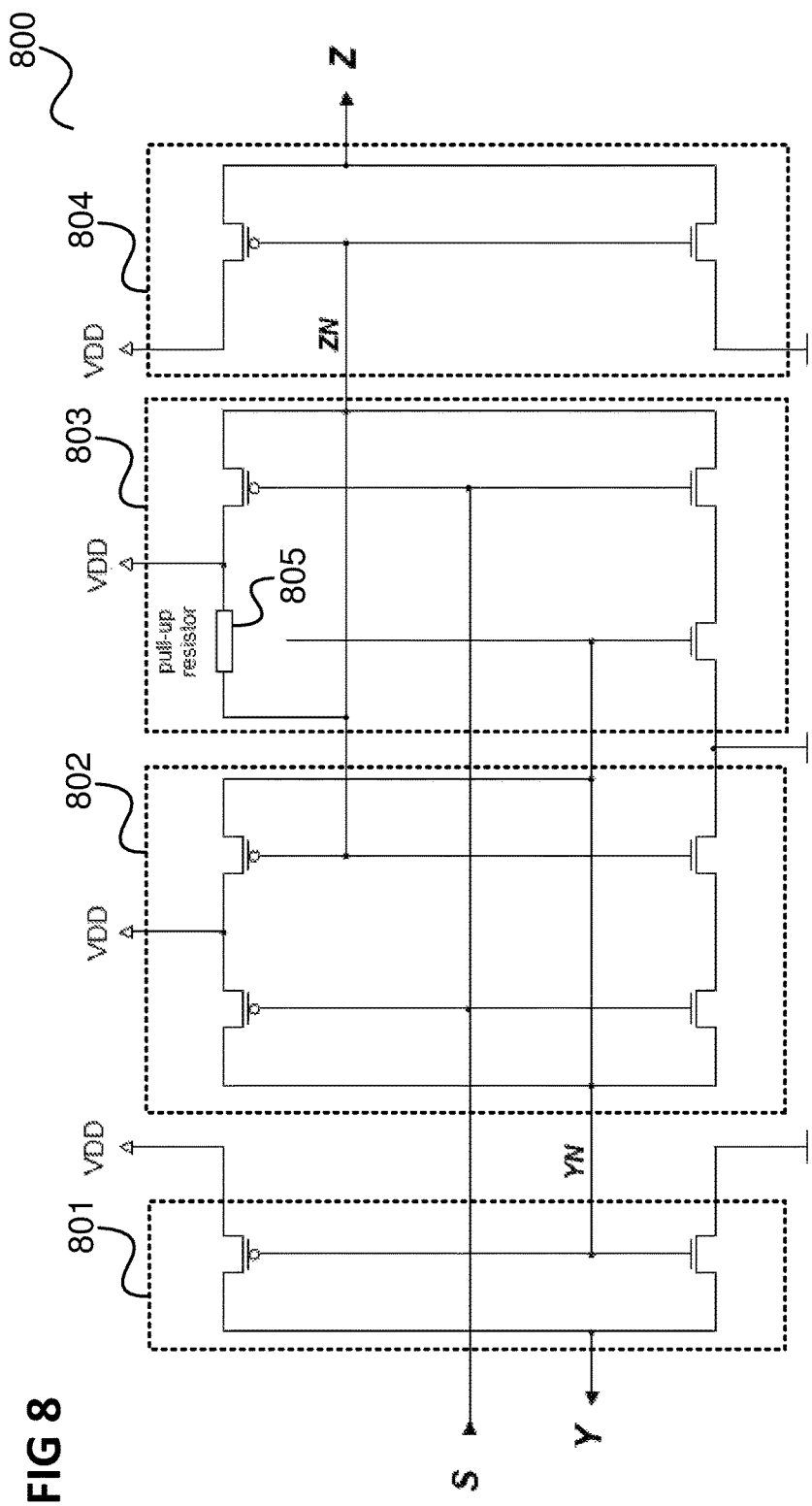
FIG. 8 shows a schematic corresponding to the RS-Flip-Flop structure of FIG. 7.

FIG. 7 shows a layout 700 of an RS-Flip-Flop structure and FIG. 8 a schematic 800 corresponding to the RS-Flip-Flop structure of FIG. 7.

The RS-Flip-Flop includes a first buffer 701, 801, a first NAND structure 702, 802, a second NAND structure 703, 803 and a second buffer 704, 804.

The second NAND structure 703, 803 includes a gate-insulator-semiconductor structure 705, 805 which fakes a pMOS transistor as described above and acts as pull-up resistor.

As a result, the RS-Flip-Flop structure shows the following behaviour with respect to its input S and its outputs Y and Z:

$S=0 \Rightarrow (Z, Y)=(0, 0);$ $S=1 \Rightarrow (Z, Y)=(0, 1);$

This means that (Z, Y)=(0, S) i.e. Z is 0 independent from the RS-Flip-Flop structure's input so that either Z or Y can be used as static or dynamic Boolean Secrets, respectively.

Figure 9:
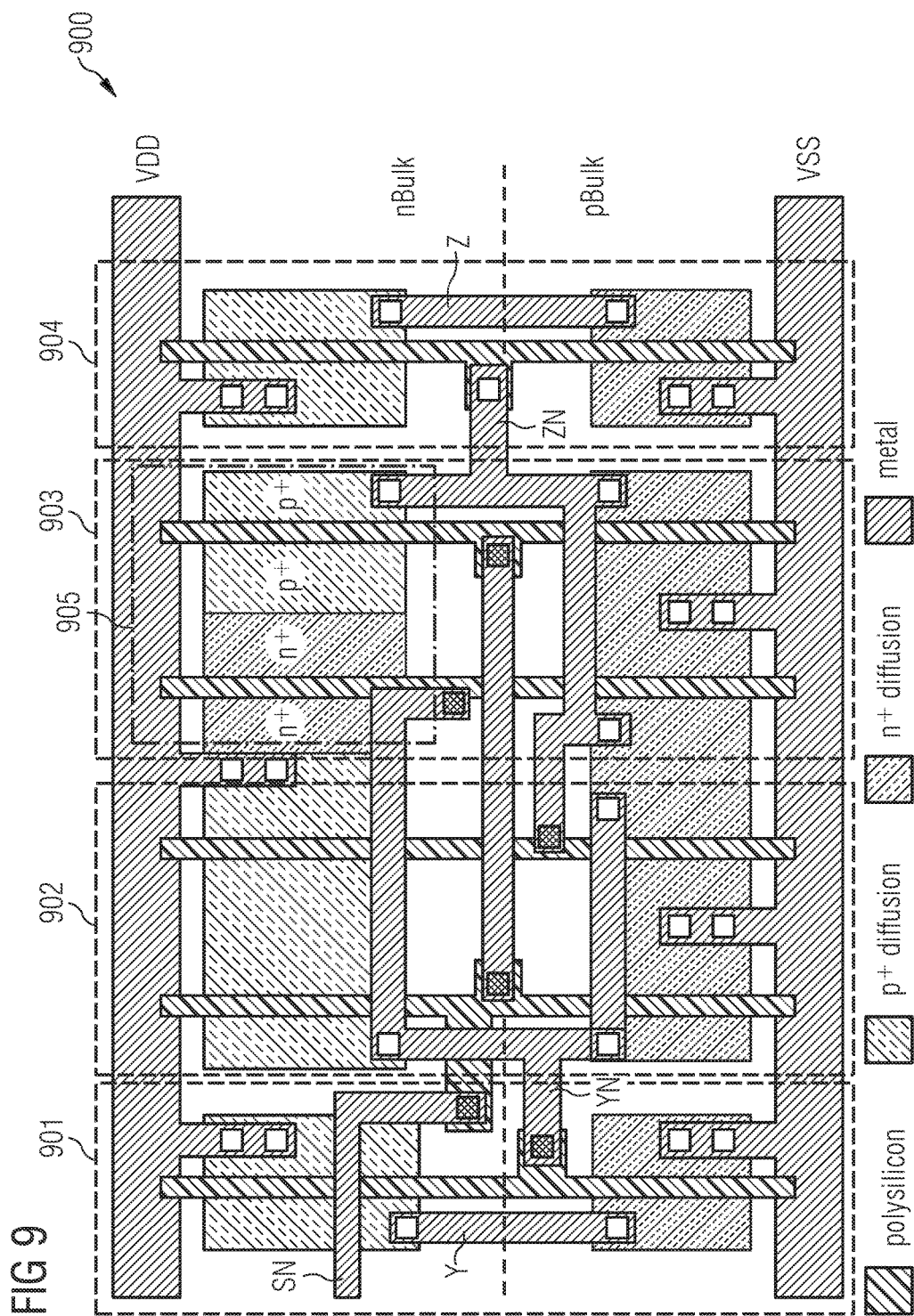
FIG. 9 shows a layout of an RS-Flip-Flop structure.
Figure 10:
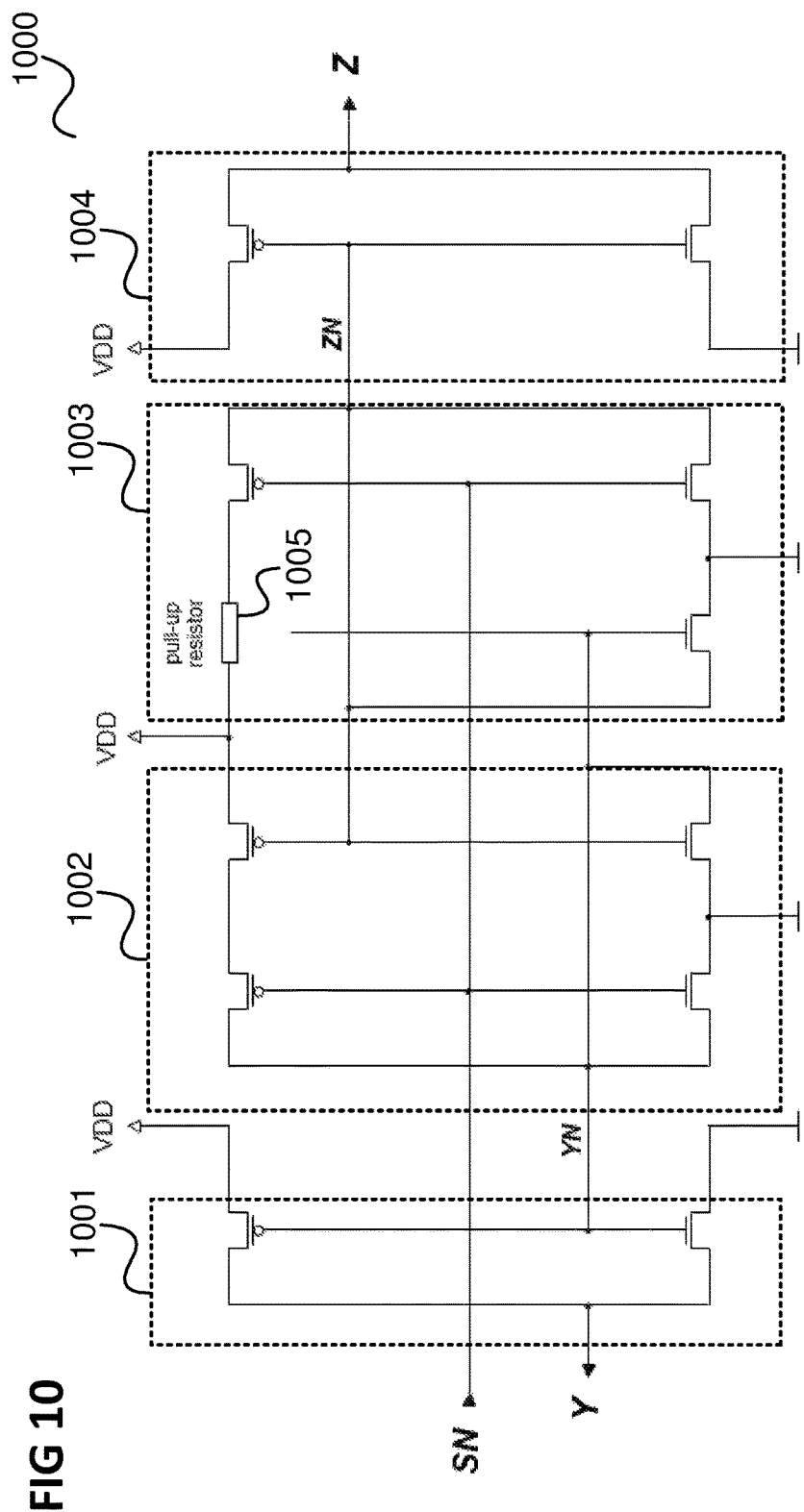
FIG. 10 shows a schematic corresponding to the RS-Flip-Flop structure of FIG. 9.

FIG. 9 shows a layout 900 of an RS-Flip-Flop structure and FIG. 10 a schematic 1000 corresponding to the RS-Flip-Flop structure of FIG. 9.

The RS-Flip-Flop includes a first buffer 901, 1001, a first NOR structure 902, 1002, a second NOR structure 903, 1003 and a second buffer 904, 1004.

The second NOR structure 903, 1003 includes a gate-insulator-semiconductor structure 905, 1005 which fakes a pMOS transistor as described above and acts as pull-up resistor.

As a result, the RS-Flip-Flop structure shows the following behaviour with respect to its input SN and its outputs Y and Z:

$SN=1 \Rightarrow (Z, Y)=(1, 1);$ $SN=0 \Rightarrow (Z, Y)=(0, 1);$

This means that (Z, Y)=(SN, 1) i.e. Y is 1 independent from the RS-Flip-Flop structure's input so that either Y or Z can be used as static or dynamic Boolean Secrets, respectively.

Figure 11:
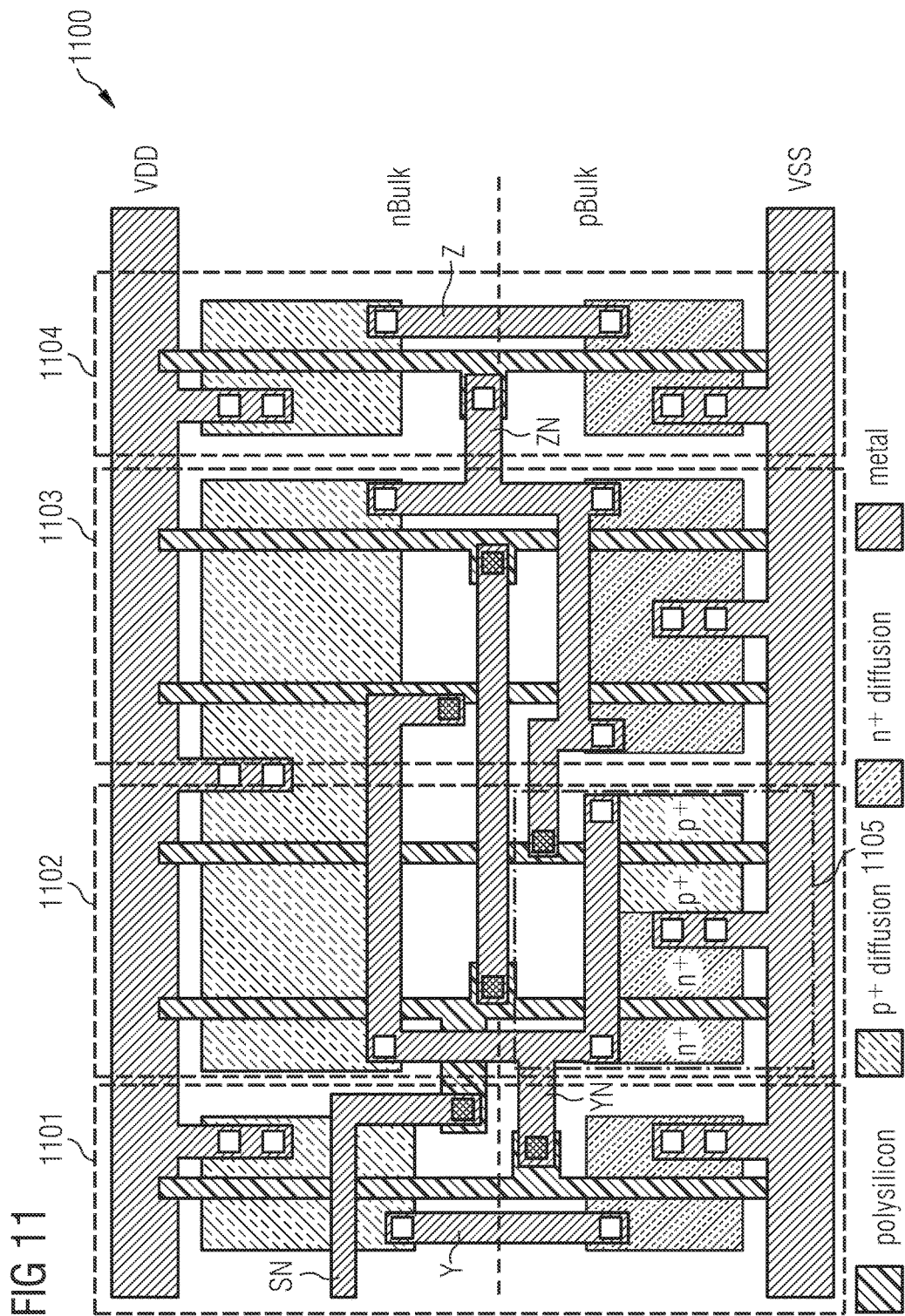
FIG. 11 shows a layout of an RS-Flip-Flop structure.
Figure 12:
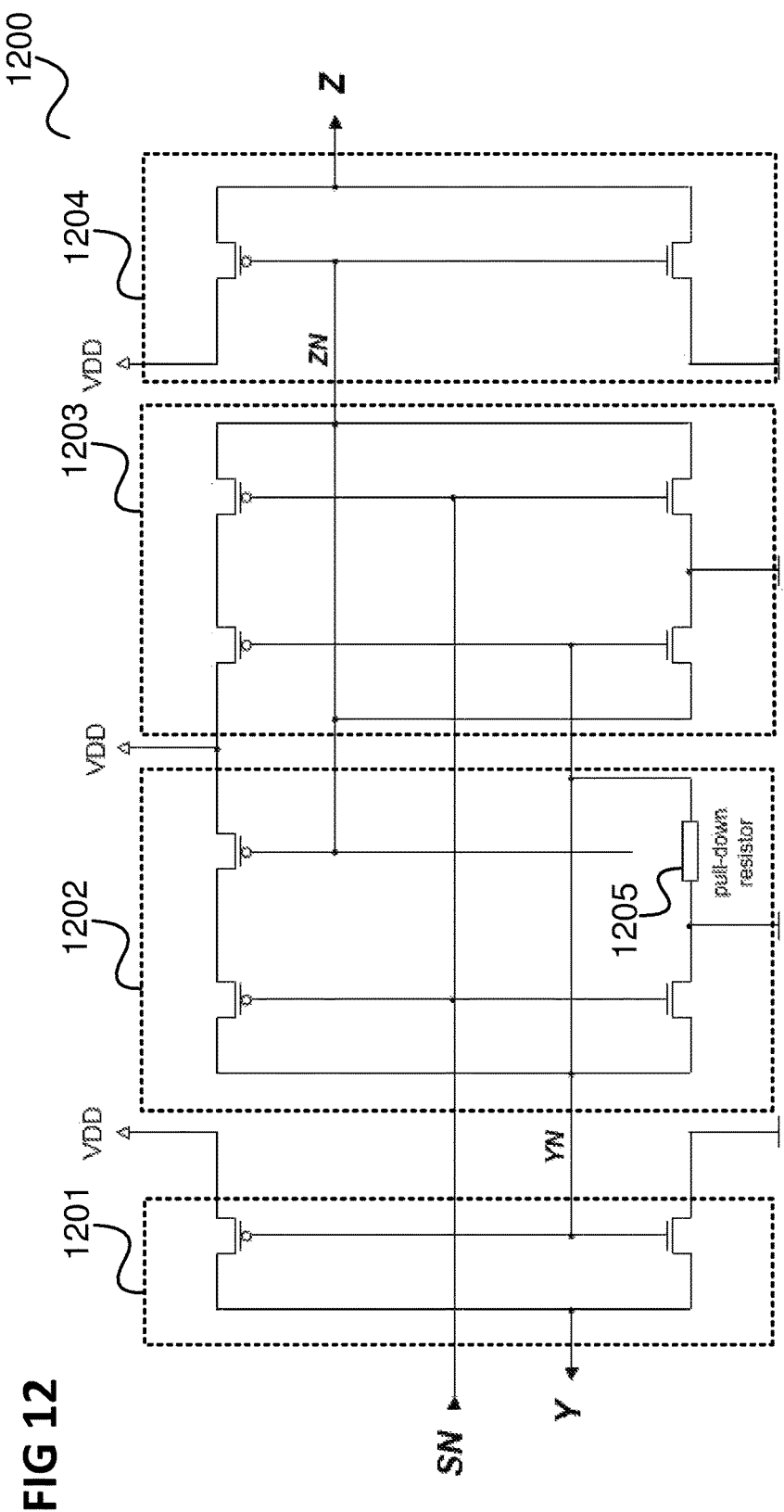
FIG. 12 shows a schematic corresponding to the RS-Flip-Flop structure of FIG. 11.

FIG. 11 shows a layout 1100 of an RS-Flip-Flop structure and FIG. 12 a schematic 1200 corresponding to the RS-Flip-Flop structure of FIG. 11.

The RS-Flip-Flop includes a first buffer 1101, 1201, a first NOR structure 1102, 1202, a second NOR structure 1103, 1203 and a second buffer 1104, 1204.

The first NOR structure 1102, 1202 includes a gate-insulator-semiconductor structure 1105, 1205 which fakes an nMOS transistor as described above and acts as pull-down resistor.

As a result, the RS-Flip-Flop structure shows the following behaviour with respect to its input SN and its outputs Y and Z:

$SN=1 \Rightarrow (Z, Y)=(1, 1);$ $SN=0 \Rightarrow (Z, Y)=(0, 1);$

This means that (Z, Y)=(SN, 1) i.e. Y is 1 independent from the RS-Flip-Flop structure's input so that either Y or Z can be used as static or dynamic Boolean Secrets, respectively.

Figure 13:
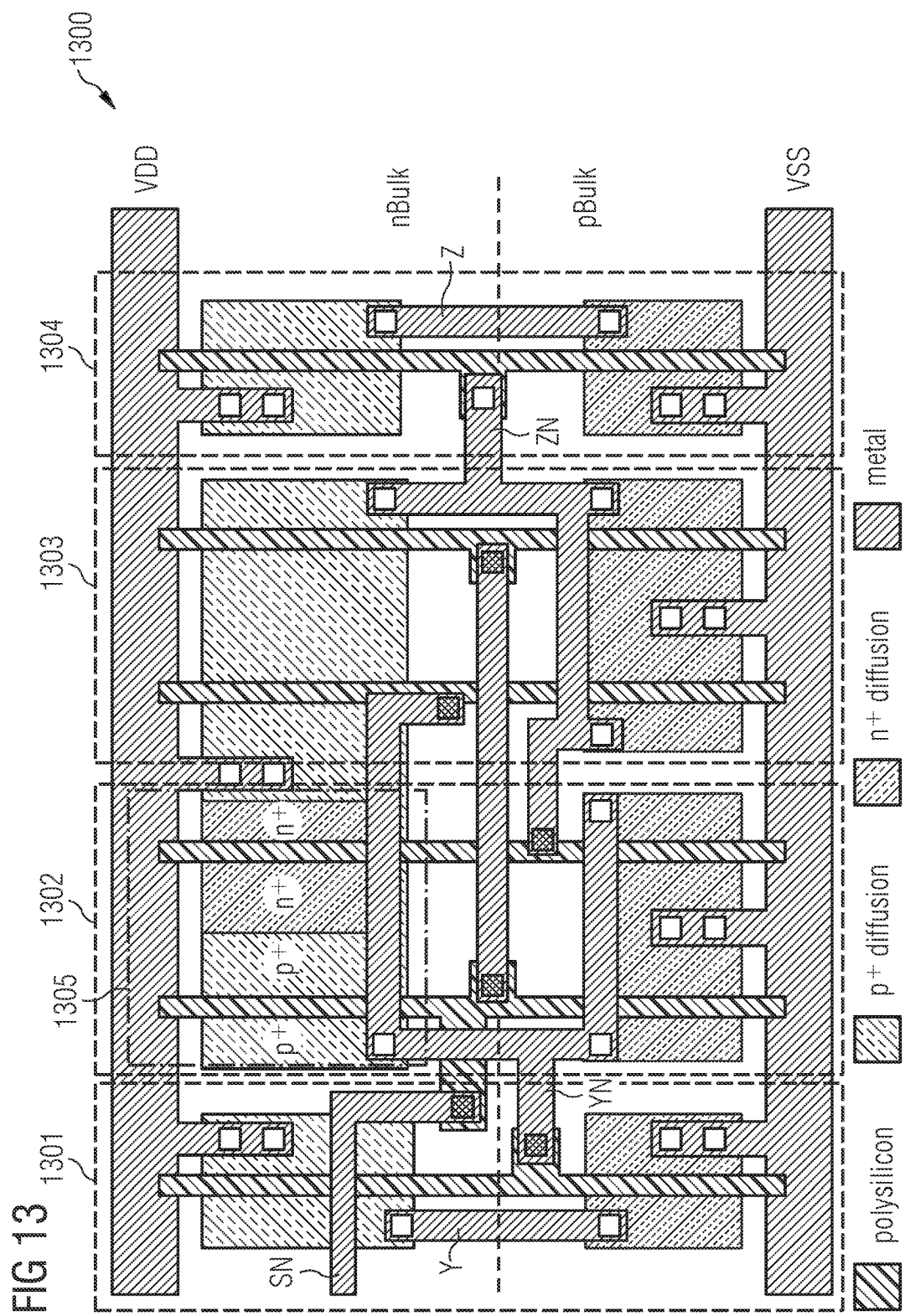
FIG. 13 shows a layout of an RS-Flip-Flop structure.
Figure 14:
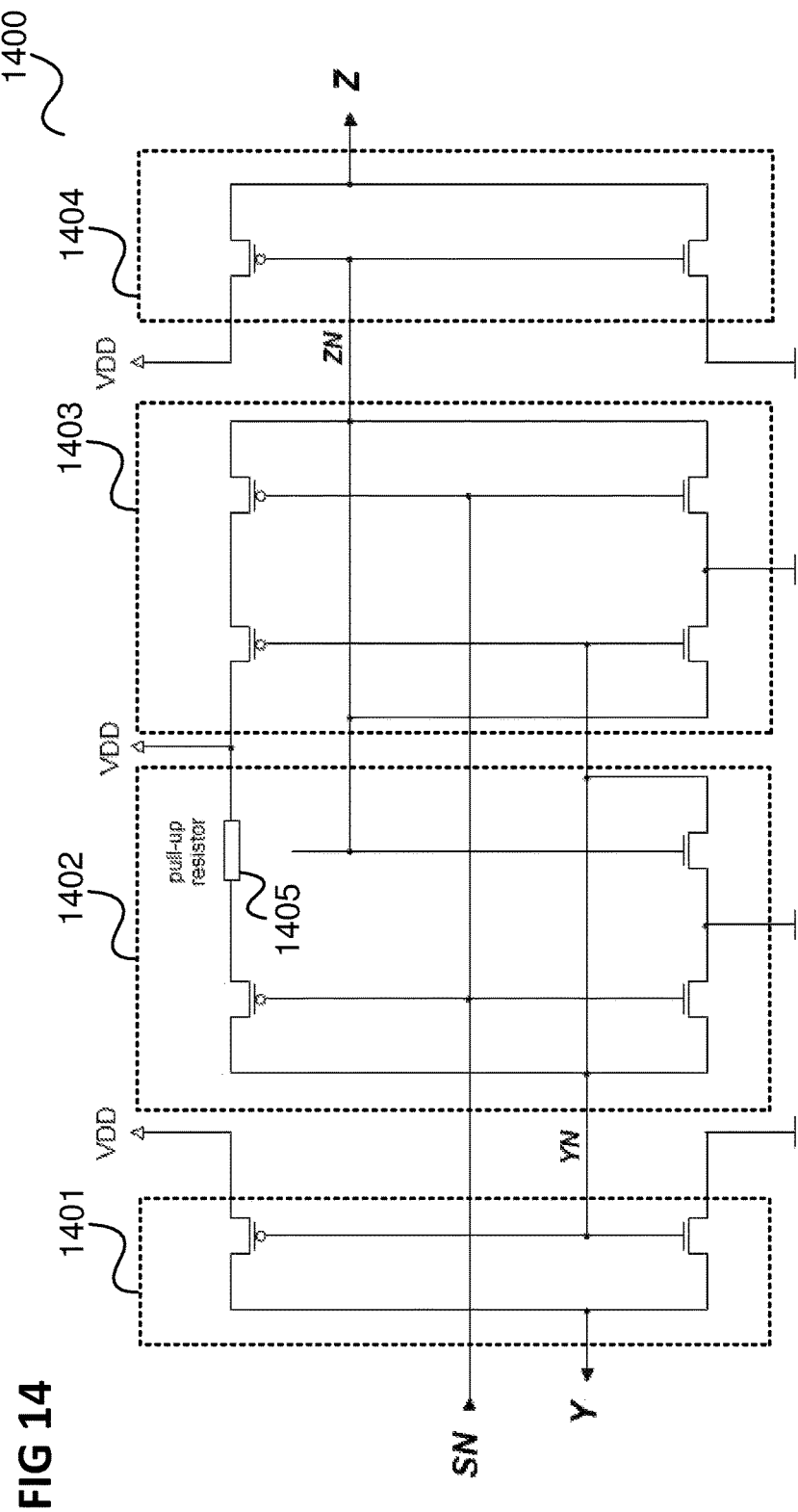
FIG. 14 shows a schematic corresponding to the RS-Flip-Flop structure of FIG. 13.

FIG. 13 shows a layout 1300 of an RS-Flip-Flop structure and FIG. 14 a schematic 1400 corresponding to the RS-Flip-Flop structure of FIG. 13.

The RS-Flip-Flop includes a first buffer 1301, 1401, a first NOR structure 902, 1002, a second NOR structure 1303, 1403 and a second buffer 1304, 1404.

The first NOR structure 1302, 1402 includes a gate-insulator-semiconductor structure 1305, 1405 which fakes a pMOS transistor as described above and acts as pull-up resistor.

As a result, the RS-Flip-Flop structure shows the following behaviour with respect to its input SN and its outputs Y and Z:

$SN=1 \Rightarrow (Z, Y)=(1, 1);$ $SN=0 \Rightarrow (Z, Y)=(1, 0);$

This means that (Z, Y)=(1, SN) i.e. Z is 1 independent from the RS-Flip-Flop structure's input so that either Z or Y can be used as static or dynamic Boolean Secrets, respectively.

Figure 15:
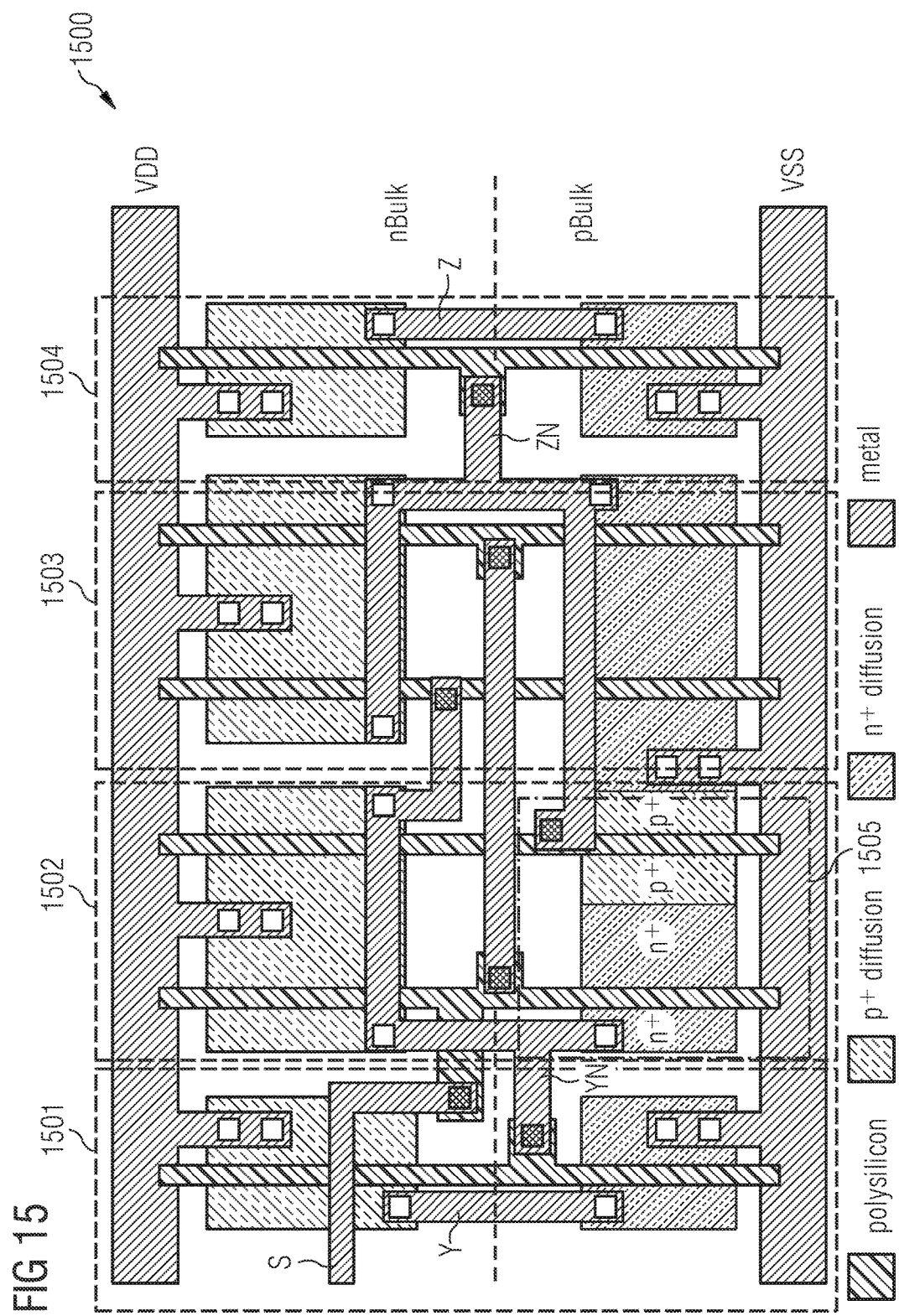
FIG. 15 shows a layout of an RS-Flip-Flop structure.
Figure 16:
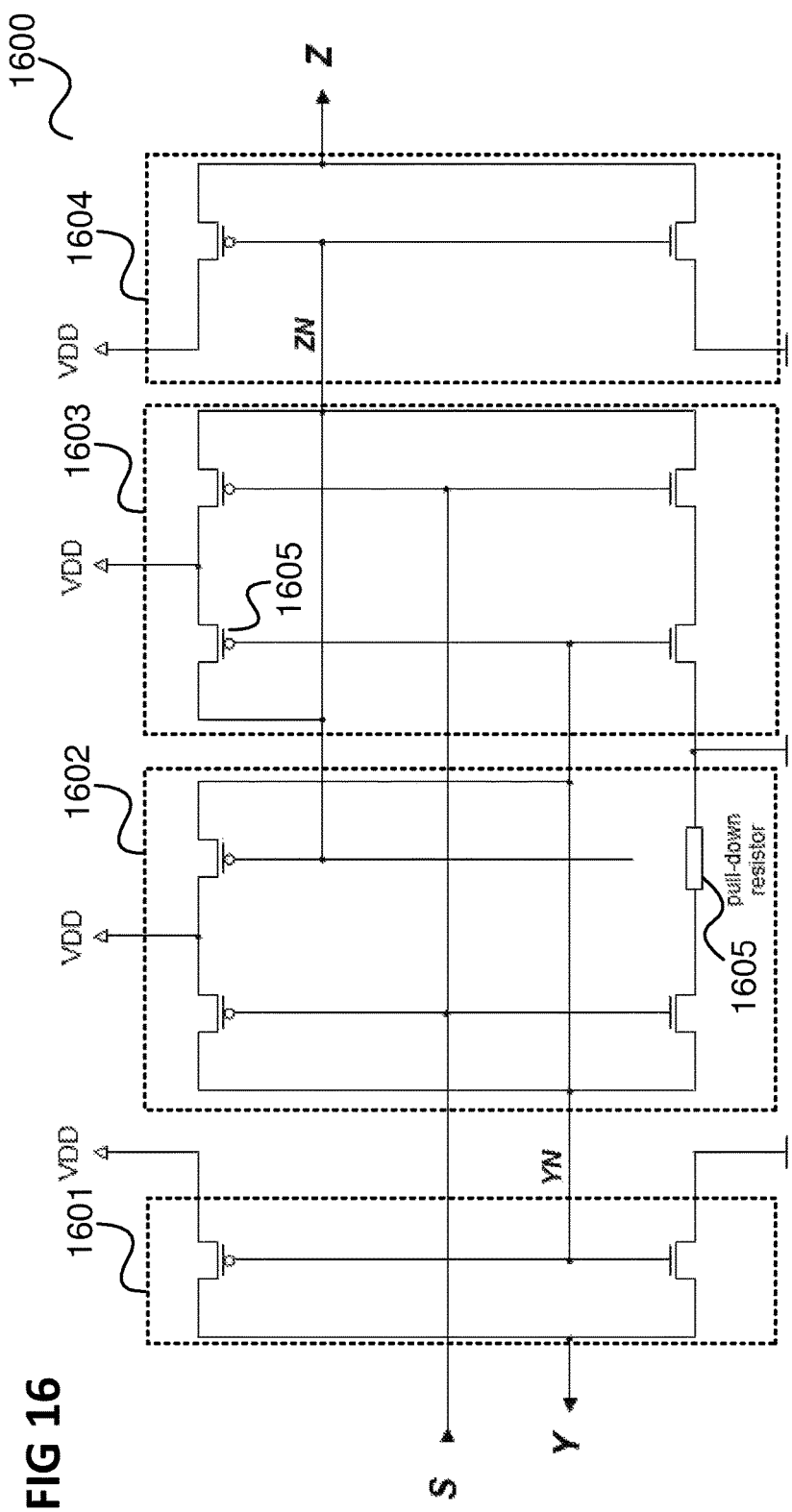
FIG. 16 shows a schematic corresponding to the RS-Flip-Flop structure of FIG. 15.

FIG. 15 shows a layout 1500 of an RS-Flip-Flop structure and FIG. 16 a schematic 1600 corresponding to the RS-Flip-Flop structure of FIG. 15.

The RS-Flip-Flop includes a first buffer 1501, 1601, a first NAND structure 1502, 1602, a second NAND structure 1503, 1603 and a second buffer 1504, 1604.

The first NAND structure 1502, 1602 includes a gate-insulator-semiconductor structure 1505, 1605 which fakes an nMOS transistor as described above and acts as pull-down resistor.

As a result, the RS-Flip-Flop structure shows the following behaviour with respect to its input S and its outputs Y and Z:

$S=0 \Rightarrow (Z, Y)=(0, 0);$ $S=1 \Rightarrow (Z, Y)=(0, 1);$

This means that (Z, Y)=(0, S) i.e. Z is 0 independent from the RS-Flip-Flop structure's input so that either Z or Y can be used as static or dynamic Boolean Secrets, respectively.

Figure 17:
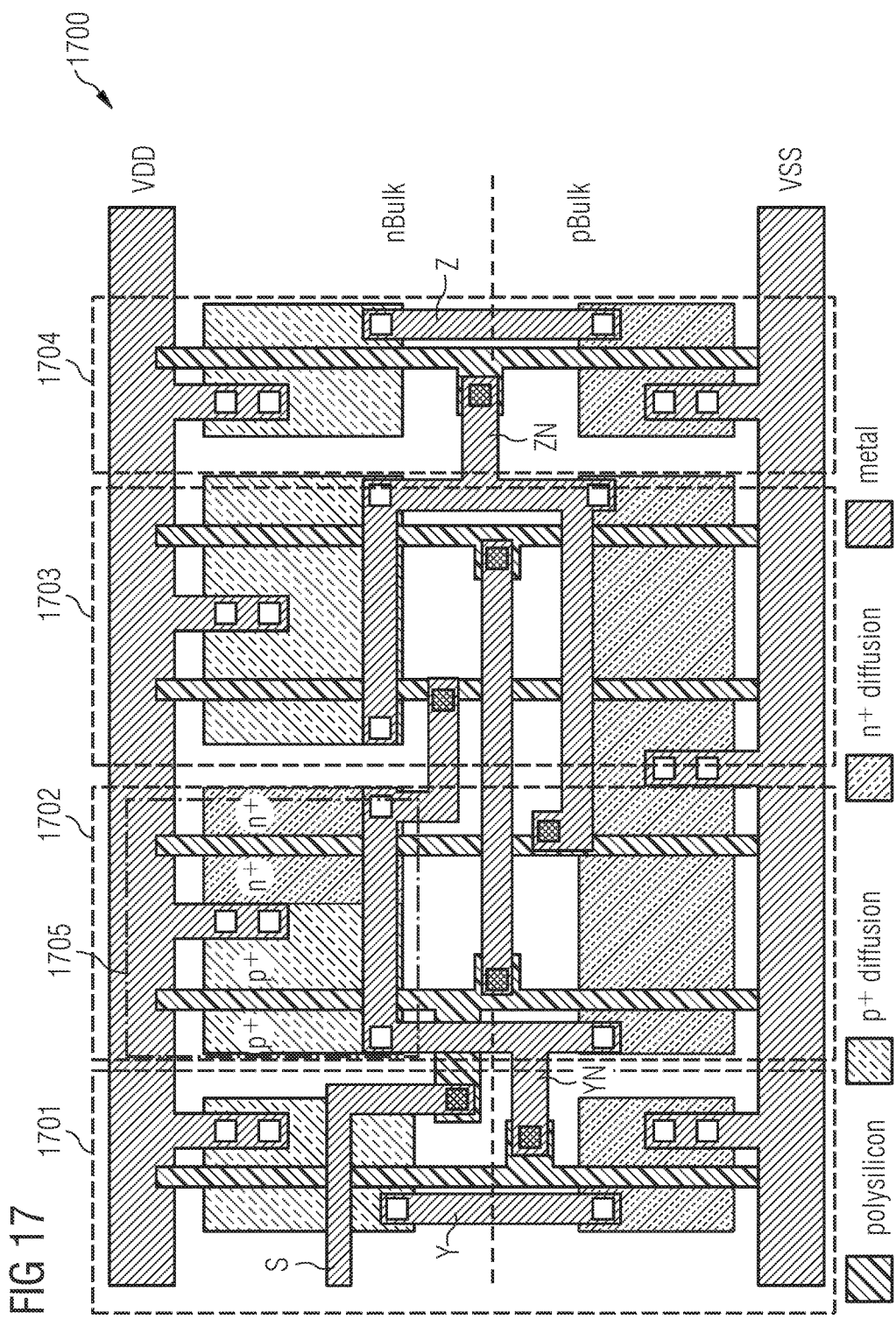
FIG. 17 shows a layout of an RS-Flip-Flop structure.
Figure 18:
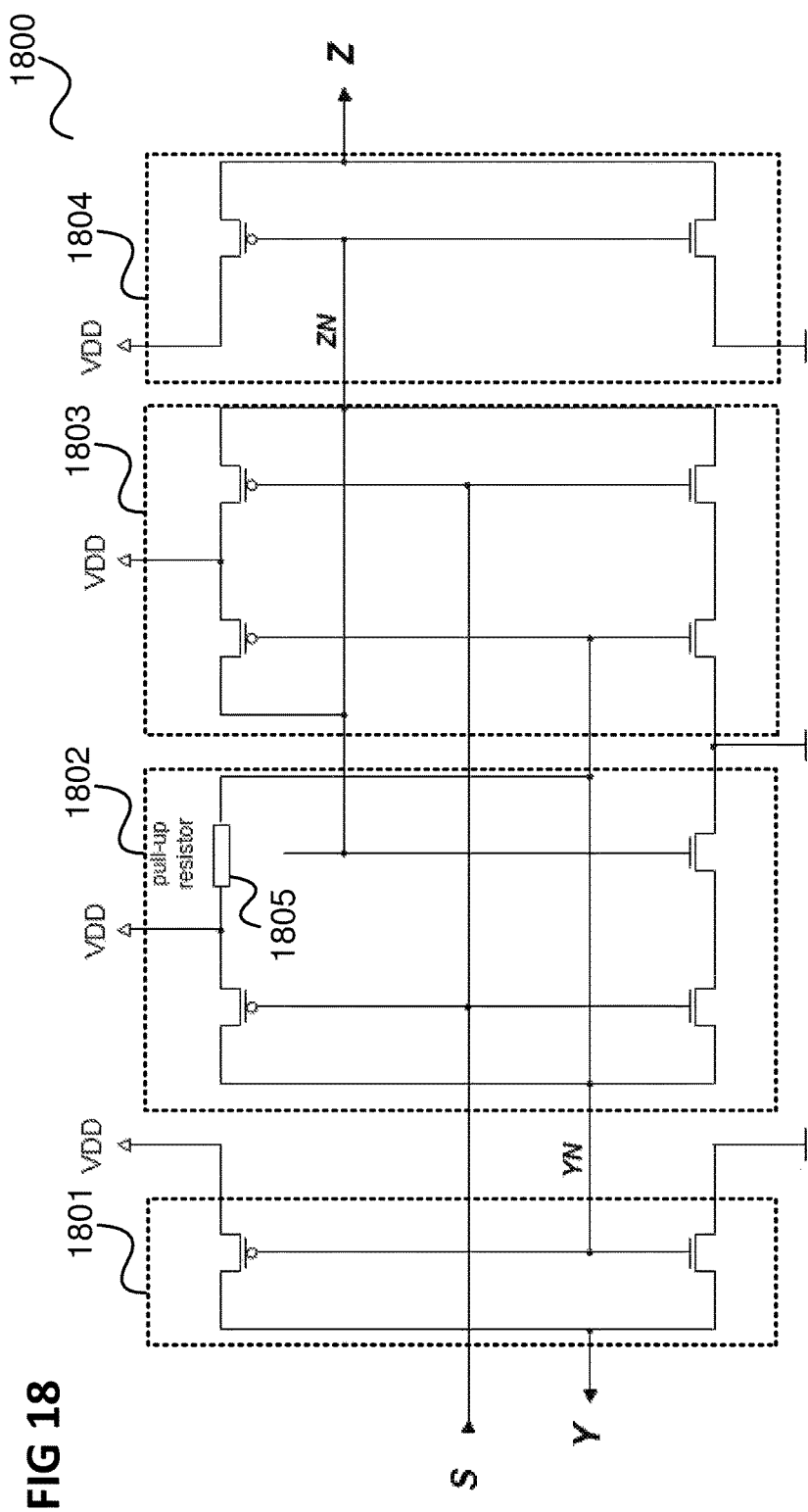
FIG. 18 shows a schematic corresponding to the RS-Flip-Flop structure of FIG. 17.

FIG. 17 shows a layout 1700 of an RS-Flip-Flop structure and FIG. 18 a schematic 1800 corresponding to the RS-Flip-Flop structure of FIG. 17.

The RS-Flip-Flop includes a first buffer 1701, 1801, a first NAND structure 1702, 1802, a second NAND structure 1703, 1803 and a second buffer 1704, 1804.

The second NAND structure 1702, 1802 includes a gate-insulator-semiconductor structure 1705, 1805 which fakes a pMOS transistor as described above and acts as pull-up resistor.

As a result, the RS-Flip-Flop structure shows the following behaviour with respect to its input S and its outputs Y and Z:

$S=0 \Rightarrow (Z, Y)=(0, 0);$ $S=1 \Rightarrow (Z, Y)=(1, 0);$

This means that (Z, Y)=(S, 0) i.e. Y is 0 independent from the RS-Flip-Flop structure's input so that either Y or Z can be used as static or dynamic Boolean Secrets, respectively.

Figure 19:
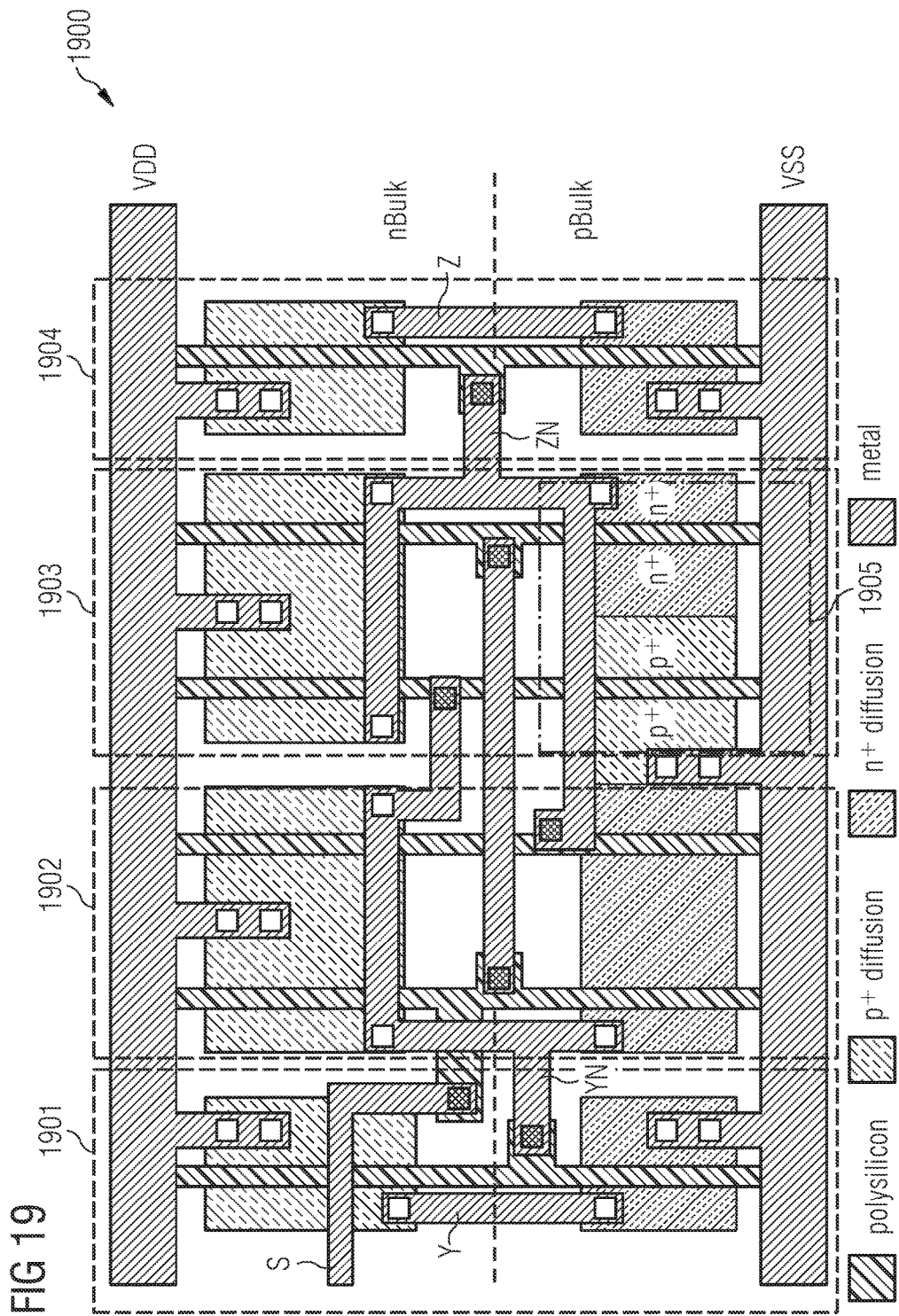
FIG. 19 shows a layout of an RS-Flip-Flop structure.
Figure 20:
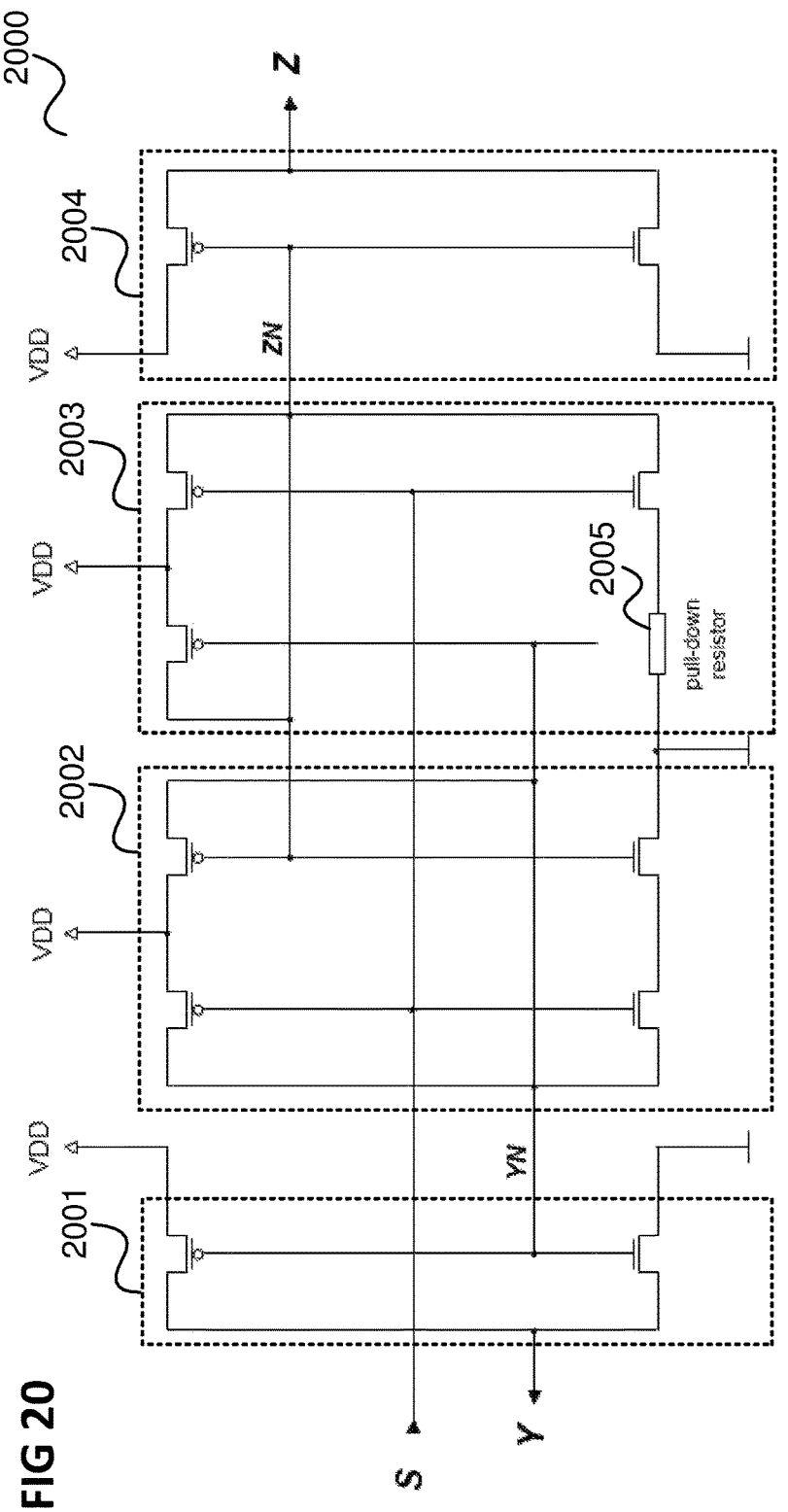
FIG. 20 shows a schematic corresponding to the RS-Flip-Flop structure of FIG. 19.

FIG. 19 shows a layout 1900 of an RS-Flip-Flop structure and FIG. 20 a schematic 2000 corresponding to the RS-Flip-Flop structure of FIG. 19.

The RS-Flip-Flop includes a first buffer 1901, 2001, a first NAND structure 1902, 2002, a second NAND structure 1903, 2003 and a second buffer 1904, 2004.

The second NAND structure 1903, 2003 includes a gate-insulator-semiconductor structure 1905, 2005 which fakes a nMOS transistor as described above and acts as pull-down resistor.

As a result, the RS-Flip-Flop structure shows the following behaviour with respect to its input S and its outputs Y and Z:

$S=0 \Rightarrow (Z, Y)=(0, 0);$ $S=1 \Rightarrow (Z, Y)=(1, 0);$

This means that (Z, Y)=(S, 0) i.e. Y is 0 independent from the RS-Flip-Flop structure's input so that either Y or Z can be used as static or dynamic Boolean Secrets, respectively.

Figure 21:
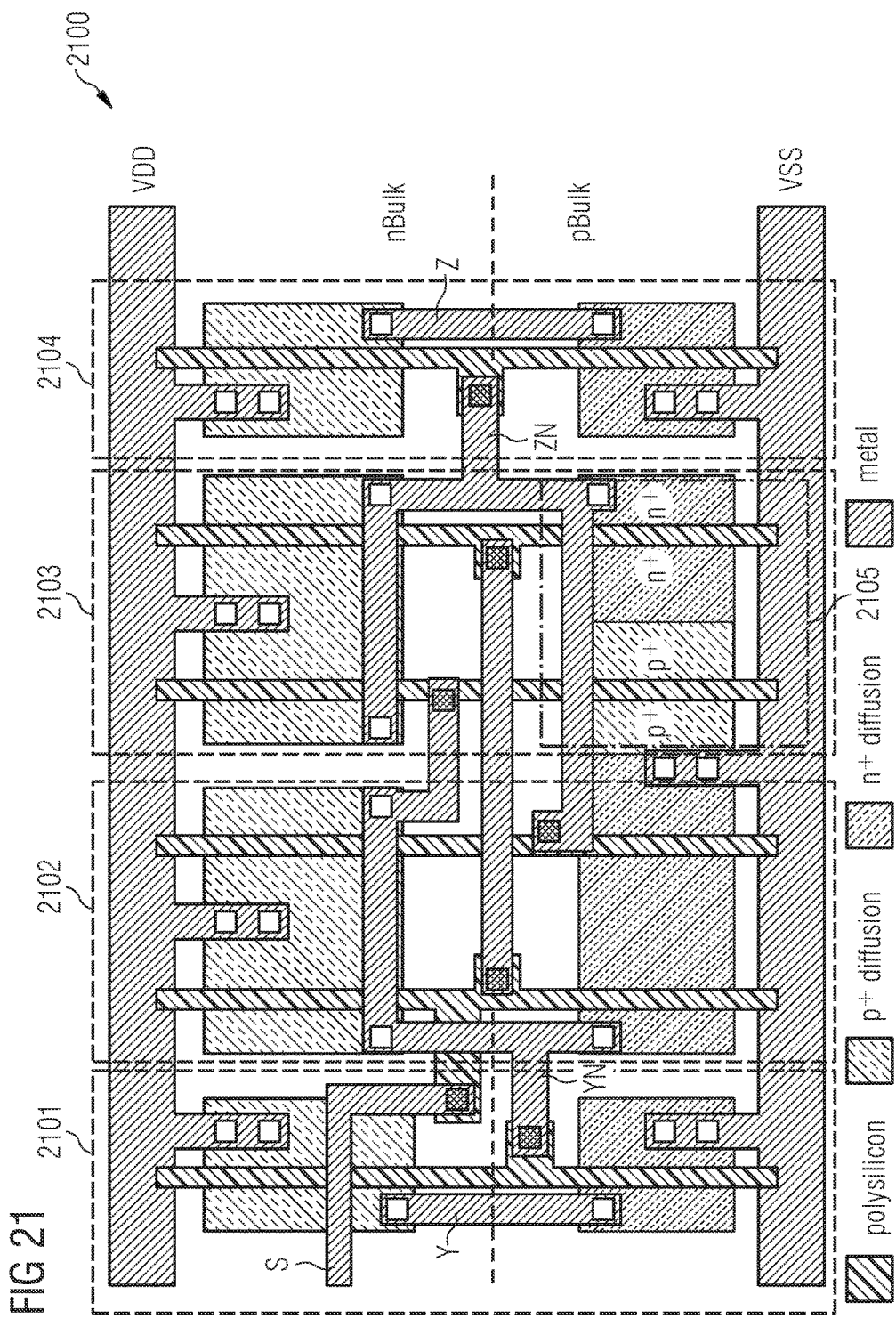
FIG. 21 shows a layout of an RS-Flip-Flop structure.
Figure 22:
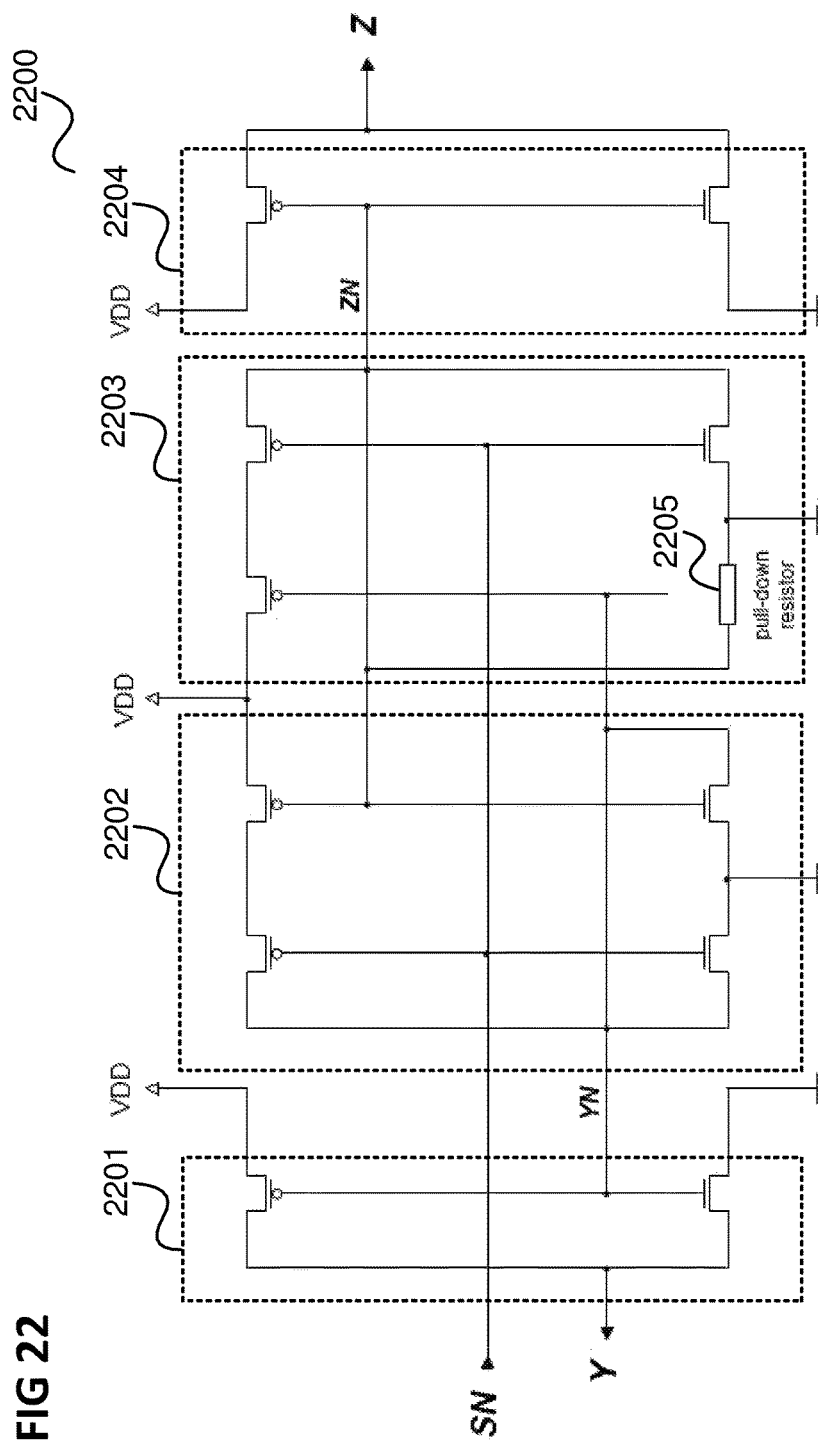
FIG. 22 shows a schematic corresponding to the RS-Flip-Flop structure of FIG. 21.

FIG. 21 shows a layout 2100 of an RS-Flip-Flop structure and FIG. 22 a schematic 2200 corresponding to the RS-Flip-Flop structure of FIG. 21.

The RS-Flip-Flop includes a first buffer 2101, 2201, a first NOR structure 2102, 2202, a second NOR structure 2103, 2203 and a second buffer 2104, 2204.

The second NOR structure 2103, 2203 includes a gate-insulator-semiconductor structure 2105, 2205 which fakes an nMOS transistor as described above and acts as pull-down resistor.

As a result, the RS-Flip-Flop structure shows the following behaviour with respect to its input S and its outputs Y and Z:

$SN=1 \Rightarrow (Z, Y)=(1, 1);$ $SN=0 \Rightarrow (Z, Y)=(1, 0);$

This means that (Z, Y)=(1, SN) i.e. Z is 1 independent from the RS-Flip-Flop structure's input so that either Z or Y can be used as static or dynamic Boolean Secrets, respectively.

Figure 23:
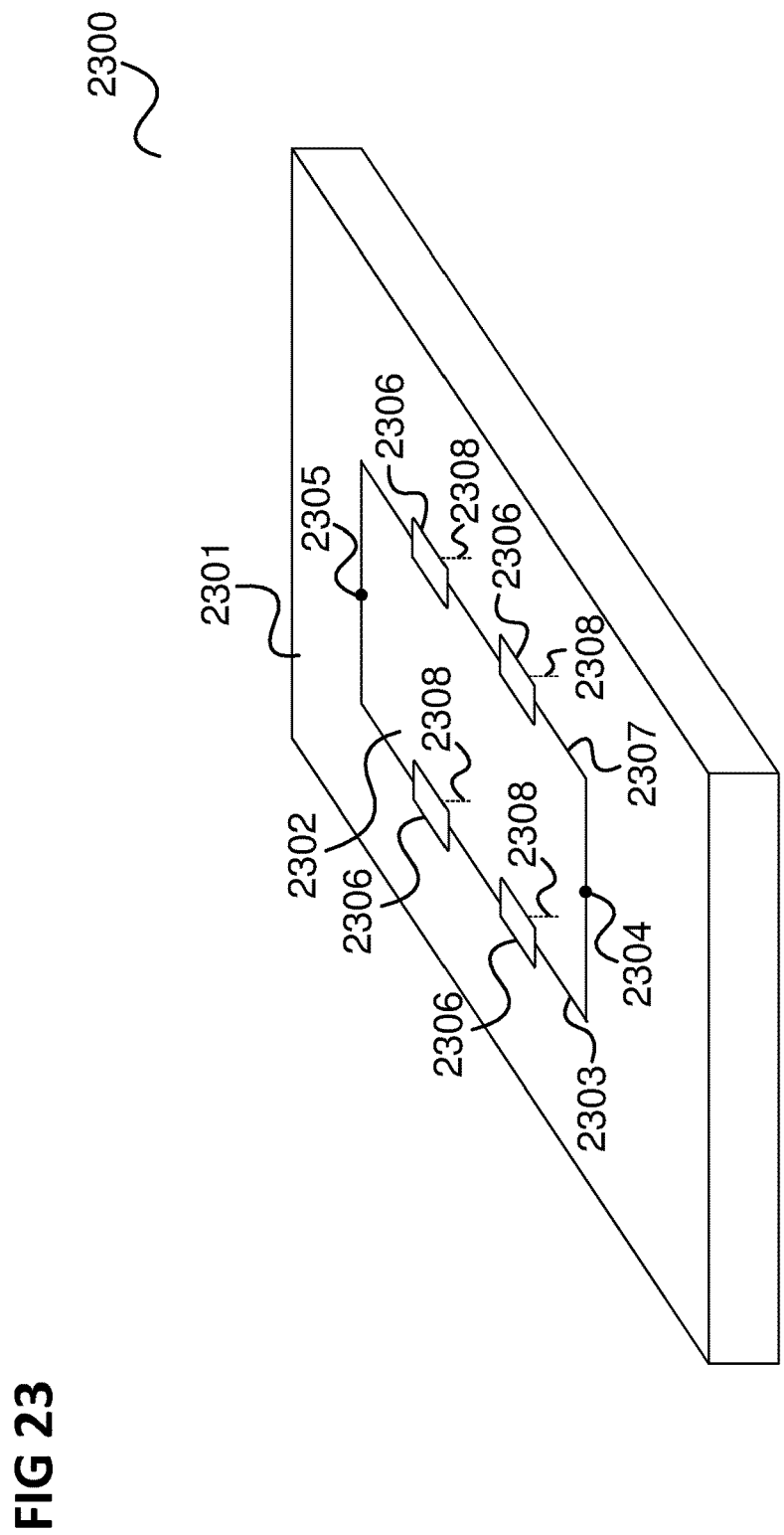
FIG. 23 shows a semiconductor chip.

In summary, according to various embodiments, a semiconductor chip 2300 is provided as illustrated in FIG. 23.

FIG. 23 shows a semiconductor chip 2300.

The semiconductor chip 2300 includes a semiconductor chip body 2301 and a semiconductor chip circuit 2302 arranged on the semiconductor chip body 2301.

The semiconductor chip circuit 2302 includes a first circuit path 2303 coupled to a first node 2304 and to a second node 2305 and includes at least two gate-insulator-semiconductor structures 2306. The semiconductor chip circuit 2302 further includes a second circuit path 2307 coupled to the first node 2304 and the second node 2305 and includes at least two gate-insulator-semiconductor structures 2306.

The first circuit path 2303 and the second circuit path 2307 are connected to set the first node 2304 and the second node 2305 to complementary logic states.

In the first circuit path 2303, at least one of the gate-insulator-semiconductor structures 2306 is configured as field effect transistor and in the second circuit path 2307 at least one of the gate-insulator-semiconductor structures 2306 is configured as field effect transistor.

Further, in at least one of the first circuit path 2303 and the second circuit path 2307, at least one of the gate-insulator-semiconductor structures 2306 is configured to connect the circuit path 2303, 2307 to the semiconductor body 2301 (as illustrated by dashed bulk connections 2308).

According to various embodiments, a circuit is arranged on a chip having two paths which set two nodes of the circuit to complementary logic states (i.e. one to a logic 1 and the other to a logic 0) wherein at least one of the two paths has, instead of a field effect transistor, a gate-insulator-semiconductor structure which implements a connection to the semiconductor body of the chip (in other words a bulk connection, i.e. a connection to the chip's substrate or to a well in the chip's substrate). The paths are for example connected such that when the first node has a specific first logic state, it switches at least one field effect transistor of at least one of the paths to set the second node to a second logic state complementary to the first logic state.

In the circuit paths, the gate-insulator-semiconductor structures are for example arranged like the field effect transistors in a CMOS (Complementary MOS) inverter and the circuit paths may for example be connected such that, if the gate-insulator-semiconductor structures were field effect transistors, the circuit would implement two cross-coupled inverters.

In the following various Examples are described.

Example 1 is a semiconductor chip as illustrated in FIG. 23.
Example 2 is the semiconductor chip of Example 1, wherein the semiconductor body is a semiconductor substrate or a well in a semiconductor substrate.
Example 3 is the semiconductor chip of Example 1 or 2, wherein in the first circuit path, at least one of the gate-insulator-semiconductor structures is configured to connect the first node to the semiconductor body.
Example 4 is the semiconductor chip of any one of Examples 1 to 3, wherein in the second circuit path, at least one of the gate-insulator-semiconductor structures is configured to connect the second node to the semiconductor body.
Example 5 is the semiconductor chip of any one of Examples 1 to 4, wherein each gate-insulator-semiconductor structure has a source terminal, a drain terminal and a gate terminal.
Example 6 is the semiconductor chip of any one of Examples 1 to 5, wherein the gate-insulator-semiconductor structures are metal-oxide-semiconductor structures.
Example 7 is the semiconductor chip of any one of Examples 1 to 6, wherein each gate-insulator-semiconductor structure comprises a gate and wherein the gates of the gate-insulator-semiconductor structures of the first circuit path form an input of the first circuit path connected to the first node and wherein the gates of the gate-insulator-semiconductor structures of the second circuit path form an input of the second circuit path connected to the second node.
Example 8 is the semiconductor chip of any one of Examples 1 to 7, wherein the first circuit path and the second circuit path are connected to set the first node to a logic 1 and the second node to a logic 0 or the first node to a logic 0 and the second node to a logic 1 depending on a logic state corresponding to a potential supplied to the semiconductor body.
Example 9 is the semiconductor chip of any one of Examples 1 to 8, wherein the semiconductor chip circuit further comprises an output connected to the first node or to the second node.
Example 10 is the semiconductor chip of Example 9, wherein the semiconductor chip further comprises further components having inputs connected to the output.
Example 11 is the semiconductor chip of Examples 10, wherein the further components are configured to operate based on a logic state provided by the semiconductor chip circuit's output.
Example 12 is the semiconductor chip of any one of Examples 1 to 11, wherein each gate-insulator-semiconductor structure comprises two doped regions separated by a gap and a gate covering the gap.
Example 13 is the semiconductor chip of Example 12, wherein, for each gate-insulator-semiconductor structure, if the gate-insulator-semiconductor structure implements a field effect transistor, the two doped regions implement a source region and a drain region.
Example 14 is the semiconductor chip of any one of Examples 1 to 13, wherein the gate-insulator-semiconductor structures are Complementary Metal Oxide Semiconductor structures.

According to a further Example, a chip is provided including a circuit including a plurality of field effect transistors and at least one gate-insulator-semiconductor structure which implements a body connection so that a circuit path of the circuit is connected to the body and an output of the circuit has a logic state corresponding to a potential supplied to the semiconductor body.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A semiconductor chip comprising:
a semiconductor chip body and
a semiconductor chip circuit arranged on the semiconductor chip body and comprising:
  a first circuit path coupled to a first node and a second node and comprising at least two gate-insulator-semiconductor structures wherein each gate-insulator-semiconductor structure has a source terminal, a drain terminal and a gate terminal;
  a second circuit path coupled to the first node and the second node and comprising at least two gate-insulator-semiconductor structures wherein each gate-insulator-semiconductor structure has a source terminal, a drain terminal and a gate terminal;
  wherein the first circuit path and the second circuit path are connected to set the first node and the second node to complementary logic states;
  wherein in the first circuit path, at least one of the gate-insulator-semiconductor structures is configured as field effect transistor and in the second circuit path at least one of the gate-insulator-semiconductor structures is configured as field effect transistor;
  wherein in at least one of the first circuit path or the second circuit path, at least one of the gate-insulator-semiconductor structures is configured to connect the at least one of the first circuit path or the second circuit path to the semiconductor body by one of the source terminal or the drain terminal, wherein a well contact is placed at a junction between the source terminal and the drain terminal used to connect the at least one of the first circuit path or the second circuit path to the semiconductor body.

2. The semiconductor chip of claim 1, wherein the well contact is an n+-nBulk ohmic contact.

3. The semiconductor chip of claim 1, wherein the well contact is a p+-pBulk ohmic contact.

4. The semiconductor chip of claim 1, wherein the semiconductor body is a semiconductor substrate or a well in a semiconductor substrate.

5. The semiconductor chip of claim 1, wherein in the first circuit path, the well contact is configured to connect the first node to the semiconductor body to form a short circuit or a resistance at the at least one of the gate-insulator-semiconductor structures.

6. The semiconductor chip of claim 1, wherein in the second circuit path, the well contact is configured to connect the second node to the semiconductor body to form a short circuit or a resistance at the at least one of the gate-insulator-semiconductor structures.

7. The semiconductor chip of claim 1, wherein the gate-insulator-semiconductor structures are metal-oxide-semiconductor structures.

8. The semiconductor chip of claim 1, wherein each gate-insulator-semiconductor structure comprises a gate and wherein the gates of the gate-insulator-semiconductor structures of the first circuit path form an input of the first circuit path connected to the first node and wherein the gates of the gate-insulator-semiconductor structures of the second circuit path form an input of the second circuit path connected to the second node.

9. The semiconductor chip of claim 1, wherein the first circuit path and the second circuit path are connected to set the first node to a logic 1 and the second node to a logic 0 or the first node to a logic 0 and the second node to a logic 1 depending on a logic state corresponding to a potential supplied to the semiconductor body.

10. The semiconductor chip of claim 1, wherein the semiconductor chip circuit further comprises an output connected to the first node or to the second node.

11. The semiconductor chip of claim 10, wherein the semiconductor chip further comprises further components having inputs connected to the output.

12. The semiconductor chip of claim 11, wherein the further components are configured to operate based on a logic state provided by the semiconductor chip circuit's output.

13. The semiconductor chip of claim 1, wherein each gate-insulator-semiconductor structure comprises two doped regions separated by a gap and a gate covering the gap.

14. The semiconductor chip of claim 13, wherein for each gate-insulator-semiconductor structure which implements a field effect transistor, the two doped regions implement a source region and a drain region.

15. The semiconductor chip of claim 1, wherein the gate-insulator-semiconductor structures are Complementary Metal Oxide Semiconductor structures.

* * * * *